(12) United States Patent
Kawai

(10) Patent No.: US 8,303,459 B2
(45) Date of Patent: Nov. 6, 2012

(54) FORWARD-REVERSE SWITCHING DEVICE FOR VEHICLE

(75) Inventor: Yasuhiro Kawai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 206 days.

(21) Appl. No.: 12/772,267

(22) Filed: May 3, 2010

(65) Prior Publication Data

US 2010/0323839 A1    Dec. 23, 2010

(30) Foreign Application Priority Data

Jun. 18, 2009   (JP) ................................. 2009-145558

(51) Int. Cl.
  *F16H 3/44* (2006.01)
  *F16H 37/02* (2006.01)
(52) U.S. Cl. ......... 475/320; 475/318; 475/319; 475/210
(58) Field of Classification Search .................. 475/207, 475/208, 209, 210, 214, 311–314, 317–320
  See application file for complete search history.

(56) References Cited

U.S. PATENT DOCUMENTS

| | | | | |
|---|---|---|---|---|
| 4,148,232 A | * | 4/1979 | Moriya | 477/98 |
| 4,406,179 A | * | 9/1983 | Numazawa et al. | 475/311 |
| 4,455,890 A | * | 6/1984 | Kuramochi et al. | 475/59 |
| 6,106,428 A | * | 8/2000 | Koneda et al. | 475/210 |
| 6,612,958 B2 | * | 9/2003 | Imai et al. | 475/210 |
| 6,979,275 B2 | * | 12/2005 | Hiraku et al. | 475/214 |
| 2009/0036246 A1 | * | 2/2009 | Bucknor et al. | 475/5 |

FOREIGN PATENT DOCUMENTS

| | | |
|---|---|---|
| JP | 11051147 A | 2/1999 |
| JP | 2005308041 A | 11/2005 |

* cited by examiner

*Primary Examiner* — Justin Holmes
*Assistant Examiner* — Colby M Hansen
(74) *Attorney, Agent, or Firm* — Gifford, Krass, Sprinkle, Anderson & Citkowski, P.C.

(57) ABSTRACT

A forward-reverse switching device for a vehicle includes a planetary gear set and a one-way clutch coupled to any two rotating elements among first, second and third rotating elements, each corresponding to any one of a ring gear, a carrier and a sun gear, of the planetary gear set. The first rotating element is coupled to a driving force source. The third rotating element is coupled to a drive wheel. Rotation of the second rotating element is prohibited to rotate the third rotating element in a direction opposite to the rotational direction of the first rotating element. The first to third rotating elements are integrally rotated to rotate the third rotating element in the same direction as the first rotating element. The one-way clutch is engaged when the rotational speed of the third rotating element exceeds the rotational speed of the first rotating element.

8 Claims, 9 Drawing Sheets

FORWARD-REVERSE SWITCHING DEVICE FOR VEHICLE

INCORPORATION BY REFERENCE

The disclosure of Japanese Patent Application No. 2009-145558 filed on Jun. 18, 2009 including the specification, drawings and abstract is incorporated herein by reference in its entirety.

BACKGROUND OF THE INVENTION

1. Field of the Invention

The invention relates to a forward-reverse switching device for a vehicle and, more particularly, to durability when the vehicle is being towed.

2. Description of the Related Art

A planetary gear type forward-reverse switching device is widely known. The forward-reverse switching device is provided for a vehicle drive train that transmits power from a driving force source to drive wheels. For example, Japanese Patent Application Publication No. 11-51147 (JP-A-11-51147) and Japanese Patent Application Publication No. 2005-308041 (JP-A-2005-308041) describe such a forward-reverse switching mechanism. FIG. 12 is a view that shows an example of a drive train 1 equipped with a forward-reverse switching device 2. The forward-reverse switching device 2 is formed of a double pinion type planetary gear set (planetary gear train) 8 as a major component as in the case of the forward-reverse switching mechanism described in JP-A-11-51147. In addition, FIG. 13A and FIG. 13B each show a nomograph that can represent the relative relationship among the rotational speeds of rotating elements in the planetary gear set 8 using straight lines. In each nomograph, $\rho$ indicated as the relationship between vertical axes is a gear ratio $\rho$ (=the number of teeth ZS of a sun gear S/the number of teeth ZR of a ring gear R) of the planetary gear set 8, $\delta 1$ is (the number of teeth ZS of the sun gear S/the number of teeth ZP1 of each pinion gear P1), and $\delta 2$ is (the number of teeth ZS of the sun gear S/the number of teeth ZP2 of each pinion gear P2). In addition, straight lines L7, L8 and L9 in the nomographs represent the relative relationship among the rotational speeds of the rotating elements. In the forward-reverse switching device 2, for example, the sun gear S is coupled to an engine 3 so that power is transmittable, a carrier CA is coupled to drive wheels 5 via an automatic transmission 4 so that power is transmittable; whereas the carrier CA and the sun gear S are selectively coupled to each other via a clutch C, and the ring gear R is selectively fixed to a non-rotating member 6 via a brake B.

In the thus configured forward-reverse switching device 2, as indicated by the straight line L7 in FIG. 13A, when the clutch C is engaged, the planetary gear set 8 is placed in an integrally rotatable state to form a forward power transmission path. Power is transmitted to rotating elements arranged adjacent to the drive wheels 5 with respect to the forward-reverse switching device 2 through the forward power transmission path in the same rotational direction as the rotational direction of the engine 3. On the other hand, as indicated by the straight line L8 in FIG. 13A, when the brake B is engaged, the planetary gear set 8 forms a reverse power transmission path. Power is transmitted to the rotating elements arranged adjacent to the drive wheels 5 with respect to the forward-reverse switching device 2 through the reverse power transmission path in the rotational direction reverse (opposite) to the rotational direction of the engine 3. In addition, when both the clutch C and the brake B are released, the forward-reverse switching device 2 places a power transmission path in a neutral state (power transmission cut-off state) in which power transmission is cut off.

SUMMARY OF THE INVENTION

Generally, in the drive train 1, for example, a working hydraulic pressure, output from (generated by) a mechanical oil pump driven by the engine 3 for rotation, is used as a source pressure to thereby supply an engagement hydraulic pressure of the clutch C or brake B and forcibly supply lubricating oil to various portions of the drive train 1. Thus, when the engine 3 is stopped, such as when the vehicle is stopped or when the vehicle is being towed, various portions of the drive train 1 are not forcibly supplied with lubricating oil that uses the working hydraulic pressure generated by the oil pump as a source pressure. Therefore, for example, when the vehicle is being towed, that is, when the drive wheels 5 are driven for rotation by a road surface, rotating members in the drive train 1 are rotated in a state where they are not forcibly supplied with lubricating oil. Particularly, in the forward-reverse switching device 2 that includes the planetary gear set 8 as a major component, as indicated by the straight line L9 in FIG. 13B, when the vehicle is being towed, that is, when the carrier CA is driven for rotation by torque from the drive wheels 5 and rotation of the sun gear S is stopped because of a stop of the engine, the two sets of pinion gears (that is, planetary gears) P1 and P2 are respectively driven for rotation at rotational speeds that are $\delta 1$ times and $\delta 2$ times as high as the rotational speed of the carrier CA. For example, the rotational speeds of the pinion gears P1 and P2 are determined by multiplying the rotational speed of each drive wheel 5 by the gear ratio of a final reduction unit 7 (that is, a reduction ratio or a final gear ratio), the gear ratio of the automatic transmission 4 (for example, maximum speed ratio used for starting the vehicle, that is, the gear ratio for minimum speed) and the $\delta 1$ (or $\delta 2$), so there is a possibility that the rotational speeds of the pinion gears P1 and P2 become high rotational speeds of about several tens of thousands (rpm) depending on a vehicle speed at which the vehicle is being towed. Then, when the vehicle is being towed, that is, when rotation of the engine 3 is stopped and various portions in the drive train 1 are not supplied with lubricating oil that uses the working hydraulic pressure generated by the oil pump as a source pressure, durability of the pinion gears P1 and P2 may particularly decrease. Note that the above described problem does not be published.

The invention provides a planetary gear type forward-reverse switching device for a vehicle, which is able to ensure durability of pinion gears when the vehicle is being towed.

An aspect of the invention relates to a forward-reverse switching device for a vehicle. The forward-reverse switching device includes: a planetary gear set that has first, second and third rotating elements, each of which corresponds to any one of a sun gear, a carrier that rotatably and revolvably supports pinion gears, and a ring gear that is in mesh with the sun gear via the pinion gears; and a one-way clutch that is coupled to the planetary gear set between any two rotating elements among the sun gear, the carrier and the ring gear. The first rotating element is coupled to a driving force source so that power is transmittable. The third rotating element is coupled to a drive wheel so that power is transmittable, the third rotating element is rotated in a direction opposite to a rotational direction of the first rotating element in such a manner that rotation of the second rotating element is prohibited, and the third rotating element is rotated in the same direction as the rotational direction of the first rotating element in such a manner that the first, second and third rotating elements are integrally rotated. The one-way clutch is engaged when the rotational speed of the third rotating element exceeds the rotational speed of the first rotating element, and idles when the rotational speed of the third rotating element does not exceed the rotational speed of the first rotating element.

In the above configuration, the forward-reverse switching device for a vehicle includes the planetary gear set that has three rotating elements, each of which corresponds to any one of the sun gear, the carrier and the ring gear that is in mesh with the sun gear via pinion gears, and the forward-reverse switching device includes the one-way clutch. Specifically, the one-way clutch is coupled to the planetary gear set between any two rotating elements among the first, second and third rotating elements. The one-way clutch is engaged when the rotational speed of the third rotating element exceeds the rotational speed of the first rotating element. The one-way clutch idles when the rotational speed of the third rotating element does not exceed the rotational speed of the first rotating element. That is, when the planetary gear set is driven for rotation by torque from the drive wheel in a state where rotation of the driving force source is stopped, that is, when the third rotating element of the planetary gear set is driven for rotation by torque from the drive wheel in a state where rotation of the first rotating element is stopped, the rotational speed of the third rotating element definitely tends to exceed the rotational speed of the first rotating element, so the one-way clutch is engaged to thereby integrally rotate the planetary gear set consequently. When the planetary gear set is integrally rotated, the pinion gears revolve but do not rotate relative to the carrier, that is, do not rotate on their axes. This prevents the pinion gears from rotating at a high speed. Thus, when the vehicle is being towed in a state where rotation of the driving force source is stopped, the one-way clutch is engaged to place the planetary gear set in an integrally rotatable state. This prevents an increase in rotational speed at which each pinion gear rotates on its axis irrespective of a vehicle speed at which the vehicle is being towed. Thus, this aspect provides a planetary gear type forward-reverse switching device for a vehicle, which is able to ensure durability of the pinion gears when the vehicle is being towed. On the other hand, when the planetary gear set is driven for rotation by torque from the driving force source, that is, when the first rotating element of the planetary gear set is driven for rotation by torque from the driving force source, and when rotation of the second rotating element is prohibited, the third rotating element is rotated in a direction opposite to the rotational direction of the first rotating element, so the one-way clutch idles. In addition, when the first, second and third rotating elements are integrally rotated, the third rotating element is rotated in the same direction and at the same rotational speed as the first rotating element, so the one-way clutch idles. In this way, when the first rotating element of the planetary gear set is driven for rotation by torque from the driving force source, the function of the forward-reverse switching device for a vehicle appropriately works, that is, the forward-reverse switching device selectively switches the rotational direction of the third rotating element between the same direction and the opposite direction with respect to the rotational direction of the first rotating element appropriately.

In the forward-reverse switching device, the planetary gear set may be a double pinion type planetary gear set, the first rotating element may be the sun gear, the second rotating element may be the ring gear, and the third rotating element may be the carrier. By so doing, when the carrier of the planetary gear set is driven for rotation by torque from the drive wheel in a state where rotation of the driving force source is stopped, that is, rotation of the sun gear is stopped, the rotational speed of the carrier definitely tends to exceed the rotational speed of the sun gear, so the one-way clutch is engaged, and the planetary gear set is integrally rotated. On the other hand, when the sun gear of the planetary gear set is driven for rotation by torque from the driving force source, the function of the forward-reverse switching device for a vehicle appropriately works, that is, the forward-reverse switching device selectively switches the rotational direction of the carrier between the same direction and the opposite direction with respect to the rotational direction of the sun gear appropriately.

In the forward-reverse switching device, the planetary gear set may be a single pinion type planetary gear set, the first rotating element may be the sun gear, the second rotating element may be the carrier, and the third rotating element may be the ring gear. By so doing, when the ring gear of the planetary gear set is driven for rotation by torque from the drive wheel in a state where rotation of the driving force source is stopped, that is, rotation of the sun gear is stopped, the rotational speed of the ring gear definitely tends to exceed the rotational speed of the sun gear, so the one-way clutch is engaged to integrally rotate the planetary gear set. On the other hand, when the sun gear of the planetary gear set is driven for rotation by torque from the driving force source, the function of the forward-reverse switching device for a vehicle appropriately works, that is, the forward-reverse switching device selectively switches the rotational direction of the ring gear between the same direction and the opposite direction with respect to the rotational direction of the sun gear appropriately.

The forward-reverse switching device may further include: a brake that selectively couples the second rotating element to a non-rotating member; and a clutch that selectively couples at least two rotating elements among the first, second and third rotating elements. By so doing, in the forward-reverse switching device for a vehicle, which includes the brake, the clutch and the planetary gear set having three rotating elements, when the first rotating element of the planetary gear set is driven for rotation by torque from the driving force source, and when the brake is engaged and the clutch is released to prohibit rotation of the second rotating element, power is transmitted to the drive wheel in the rotational direction opposite to the rotational direction of the driving force source, so the one-way clutch idles. In addition, when the clutch is engaged and the brake is released to thereby integrally rotate the first, second and third rotating elements, power is transmitted to the drive wheel in the same rotational direction as the driving force source, so the one-way clutch idles. In this way, when the first rotating element of the planetary gear set is driven for rotation by torque from the driving force source, the function of the forward-reverse switching device for a vehicle appropriately works, that is, the forward-reverse switching device selectively switches between the forward power transmission path and the reverse power transmission path appropriately. In the forward-reverse switching device, when the brake is engaged and the clutch is released, rotation of the second rotating element may be prohibited to form a reverse power transmission path through which power is transmitted to the drive wheel in a rotational direction opposite to the rotational direction of the driving force source, and, when the clutch is engaged and the brake is released, the planetary gear set may be placed in an integrally rotatable state to form a forward power transmission path through which power is transmitted to the drive wheel in the same rotational direction as the driving force source.

In the forward-reverse switching device, the one-way clutch may be coupled to the planetary gear set between the second rotating element and the third rotating element, the one-way clutch may be engaged when the rotational speed of the third rotating element exceeds the rotational speed of the second rotating element, and the one-way clutch may idle when the rotational speed of the third rotating element does not exceed the rotational speed of the second rotating element. By so doing, when the third rotating element of the planetary gear set is driven for rotation by torque from the drive wheel in a state where rotation of the first rotating element is stopped, the rotational speed of the third rotating element definitely tends to exceed the rotational speed of the second rotating element, so the one-way clutch is engaged to integrally rotate the planetary gear set. On the other hand, when the first rotating element of the planetary gear set is driven for rotation by torque from the driving force source, the function of the forward-reverse switching device for a vehicle appropriately works, that is, the forward-reverse switching device selectively switches the rotational direction of the third rotating element between the same direction and the opposite direction with respect to the rotational direction of the first rotating element appropriately.

In the forward-reverse switching device, the one-way clutch may be coupled to the planetary gear set between the first rotating element and the second rotating element, the one-way clutch may be engaged when the rotational speed of the second rotating element exceeds the rotational speed of the first rotating element, and the one-way clutch may idle when the rotational speed of the second rotating element does not exceed the rotational speed of the first rotating element. By so doing, when the third rotating element of the planetary gear set is driven for rotation by torque from the drive wheel in a state where rotation of the first rotating element is stopped, the rotational speed of the second rotating element definitely tends to exceed the rotational speed of the first rotating element, so the one-way clutch is engaged to integrally rotate the planetary gear set. On the other hand, when the first rotating element of the planetary gear set is driven for rotation by torque from the driving force source, the function of the forward-reverse switching device for a vehicle appropriately works, that is, the forward-reverse switching device selectively switches the rotational direction of the third rotating element between the same direction and the opposite direction with respect to the rotational direction of the first rotating element appropriately.

In the forward-reverse switching device, the one-way clutch may be coupled to the planetary gear set between the first rotating element and the third rotating element, the one-way clutch may be engaged when the rotational speed of the third rotating element exceeds the rotational speed of the first rotating element, and the one-way clutch may idle when the rotational speed of the third rotating element does not exceed the rotational speed of the first rotating element. By so doing, when the third rotating element of the planetary gear set is driven for rotation by torque from the drive wheel in a state where rotation of the first rotating element is stopped, the rotational speed of the third rotating element definitely tends to exceed the rotational speed of the first rotating element, so the one-way clutch is engaged to integrally rotate the planetary gear set. On the other hand, when the first rotating element of the planetary gear set is driven for rotation by torque from the driving force source, the function of the forward-reverse switching device for a vehicle appropriately works, that is, the forward-reverse switching device selectively switches the rotational direction of the third rotating element between the same direction and the opposite direction with respect to the rotational direction of the first rotating element appropriately.

The forward-reverse switching device may be supplied with lubricating oil by an oil pump that is driven for rotation by the driving force source. By so doing, in a practical vehicle drive train that includes an automatic transmission, when the vehicle is being towed in a state where rotation of the driving force source is stopped, the one-way clutch is engaged to place the planetary gear set in an integrally rotatable state. This prevents an increase in rotational speed at which each pinion gear rotates on its axis irrespective of a vehicle speed at which the vehicle is being towed. Thus, when the vehicle is being towed in a state where rotation of the driving force source is stopped and no lubricating oil that uses working hydraulic pressure generated by the oil pump as a source pressure is forcibly supplied, it is possible to ensure durability of the pinion gears. In addition, when the planetary gear set is driven for rotation by torque from the driving force source, the forward-reverse switching device for a vehicle is appropriately operated. In the forward-reverse switching device, the third rotating element may be coupled to the drive wheel via an automatic transmission, and the oil pump may generate working hydraulic pressure that is a source pressure for carrying out shift operation of the automatic transmission.

In the forward-reverse switching device, the automatic transmission may be a belt-type continuously variable transmission that includes a pair of variable pulleys of which effective diameters are variable and a transmission belt that is wound between the pair of variable pulleys, and that steplessly varies a speed ratio in such a manner that the effective diameters of the pair of variable pulleys are varied oppositely. That is, the belt-type continuously variable transmission is an automatic transmission that includes an input pulley, an output pulley and a power transmission member that is wound around the pulleys to interlock the pulleys, and that changes the groove widths of the respective pulleys to vary a speed ratio at a ratio of contact diameters of the power transmission member on the pulleys. By so doing, in the practical vehicle drive train that includes the belt-type continuously variable transmission, when the vehicle is being towed in a state where rotation of the driving force source is stopped and no lubricating oil that uses working hydraulic pressure generated by the oil pump as a source pressure is forcibly supplied, it is possible to appropriately ensure durability of the pinion gears. In addition, when the planetary gear set is driven for rotation by torque from the driving force source, the forward-reverse switching device for a vehicle is appropriately operated.

In the forward-reverse switching device, the automatic transmission may be, for example, a toroidal-type continuously variable transmission that includes a pair of cone members arranged concentrically and relatively rotatably and a plurality of rollers arranged between the pair of cone members in a clamped manner, and that continuously varies a speed ratio in such a manner that rotation axes of the rollers are pivoted within a plane that includes rotation axes of the pair of cone members. That is, the toroidal-type continuously variable transmission is an automatic transmission that includes an input disk, an output disk and rollers that is clamped between the disks to interlock the disks, and that changes inclinations of the rollers to vary a speed ratio at a ratio of contact point diameters of the rollers on the disks.

In the forward-reverse switching device, an engine or an internal combustion engine, such as a gasoline engine and a diesel engine, is widely used as the driving force source. In the forward-reverse switching device, an electric motor, or the like, may be used as an assist power source for propelling the vehicle in addition to the engine. In the forward-reverse switching device, only an electric motor may be used as a power source for propelling the vehicle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described in detail with reference to the accompanying drawings.

Figure 1:
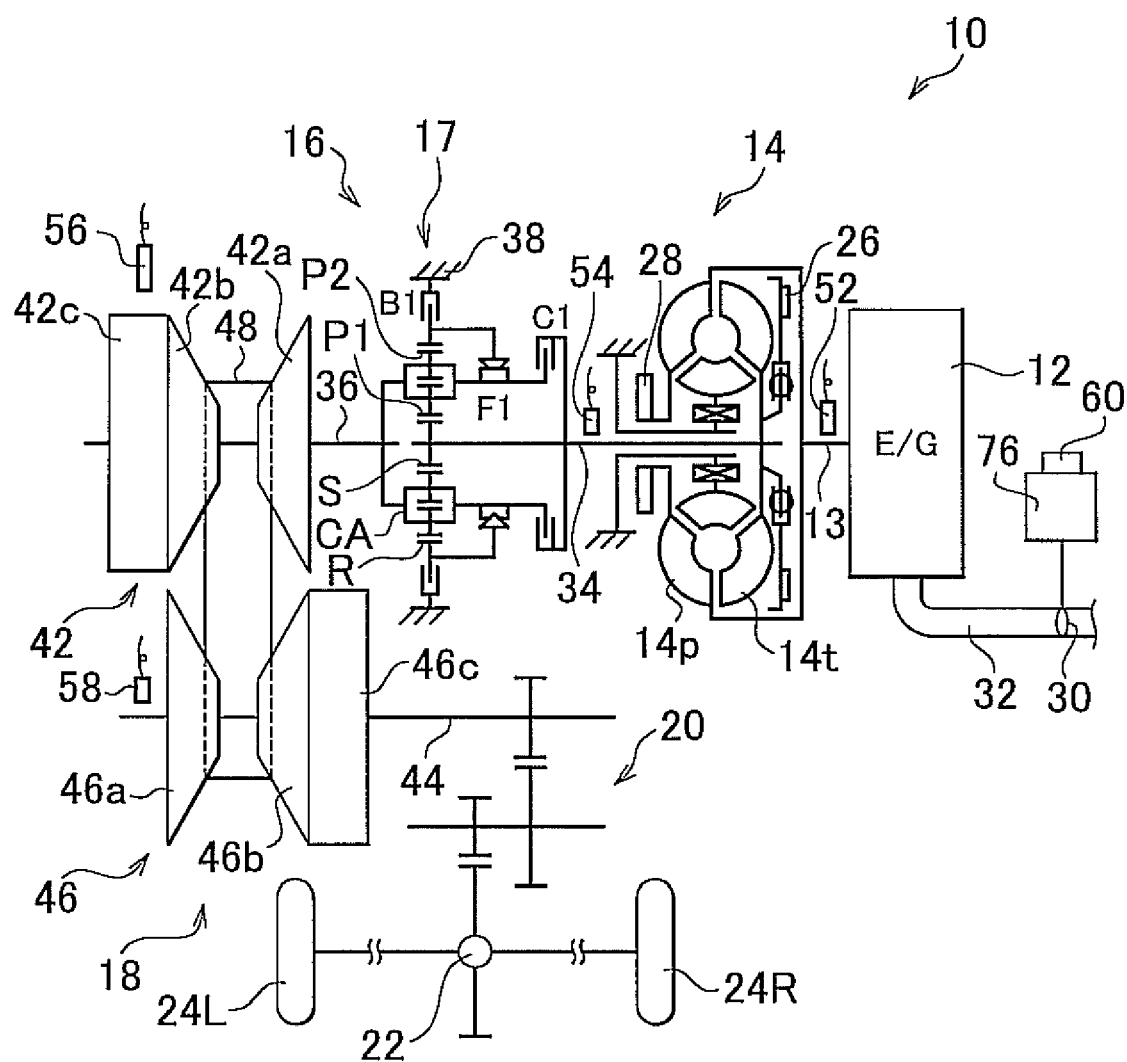
FIG. 1 is a skeleton view that illustrates a vehicle drive train equipped with a forward-reverse switching device for a vehicle according to a first embodiment of the invention.

FIG. 1 is a skeleton view that illustrates the configuration of a vehicle drive train 10 that is equipped with a forward-reverse switching device 16 for a vehicle (hereinafter, forward-reverse switching device 16) according to a first embodiment of the invention. The vehicle drive train 10 is a transversely mounted automatic transmission that is suitably employed for a front-engine front-drive (FF) vehicle. An engine 12 is an internal combustion engine and serves as a driving force source for propelling the vehicle. The power of the engine 12 is transmitted to left and right drive wheels 24L and 24R (hereinafter, when left and right drive wheels are not distinguished from each other, simply referred to as "drive wheels 24") via a torque converter 14, the forward-reverse switching device 16, a belt-type continuously variable transmission (CVT) 18, a reduction gear 20, a differential gear unit 22, and the like, sequentially. The torque converter 14 serves as a fluid transmission device and is equipped for the vehicle drive train 10. The belt-type continuously variable transmission 18 serves as an automatic transmission.

The torque converter 14 includes a pump impeller 14p and a turbine impeller 14t. The pump impeller 14p is coupled to a crankshaft 13 of the engine 12. The turbine impeller 14t is coupled to the forward-reverse switching device 16 via a turbine shaft 34. The turbine shaft 34 corresponds to an output member of the torque converter 14. The torque converter 14 transmits power via fluid. In addition, a lock-up clutch 26 is provided between those pump impeller 14p and turbine impeller 14t. Supply of hydraulic pressure to an engage-side fluid chamber or to a release-side fluid chamber is switched by a lock-up control valve (L/C control valve) (not shown), or the like, in a hydraulic pressure control circuit 100 (see FIG. 3 and FIG. 4) to thereby engage or release the lock-up clutch 26. The hydraulic pressure control circuit 100 serves as a hydraulic pressure circuit. When the lock-up clutch 26 is completely engaged, the pump impeller 14p and the turbine impeller 14t are integrally rotated. A mechanical oil pump 28 is coupled to the pump impeller 14p. The oil pump 28 is driven for rotation by the engine 12 to generate hydraulic pressure for carrying out shift control over the belt-type continuously variable transmission 18 (hereinafter, continuously variable transmission 18), generating belt clamping force, carrying out engagement/release control over the lock-up clutch 26, switching a power transmission path in the forward-reverse switching device 16 and supplying lubricating oil to various portions in the vehicle drive train 10. The continuously variable transmission 18 serves as an automatic transmission.

The forward-reverse switching device 16 is formed of a forward clutch C1, a reverse brake B1 and a double pinion type planetary gear set 17 as major components. The planetary gear set 17 has a predetermined gear ratio ρ (=the number of teeth ZS of a sun gear S/the number of teeth ZR of a ring gear R). The planetary gear set 17 includes the sun gear S, a plurality of pairs of first pinion gear P1 and second pinion gear P2, a carrier CA and the ring gear R as rotating elements (elements). The pairs of first pinion gear P1 and second pinion gear P2 are respectively in mesh with each other. The carrier CA rotatably and revolvably supports the first and second pinion gears P1 and P2. The ring gear R is in mesh with the sun gear S via the first and second pinion gears P1 and P2. In the forward-reverse switching device 16, the sun gear S is integrally coupled to the turbine shaft 34 of the torque converter 14. That is, the sun gear S is coupled to the engine 12 so that power is transmittable. The carrier CA is integrally coupled to an input shaft 36 of the continuously variable transmission 18. That is, the carrier CA is coupled to the drive wheels 24 so that power is transmittable. In addition, the carrier CA and the sun gear S are selectively coupled to each other via the forward clutch C1, and the ring gear R is selectively fixed to a housing 38 via the reverse brake B1. The housing 38 serves as a non-rotating member. Note that the forward clutch C1 and the reverse brake B1 correspond to interrupting devices, and are, for example, hydraulic frictional engagement devices each are frictionally engaged by a hydraulic cylinder.

In the thus configured forward-reverse switching device 16, when the forward clutch C1 is engaged and the reverse brake B1 is released, the forward-reverse switching device 16 is placed in an integrally rotatable state to directly couple the turbine shaft 34 to the input shaft 36. Thus, the forward-reverse switching device 16 forms (attains) a forward power transmission path, and rotation in the forward direction, that is, forward traveling power, is transmitted to the continuously variable transmission 18. In addition, when the reverse brake B1 is engaged and the forward clutch C1 is released, the forward-reverse switching device 16 forms (attains) a reverse power transmission path. Thus, the input shaft 36 is rotated in the direction reverse to the turbine shaft 34, and rotation in the reverse direction, that is, reverse traveling power, is transmitted to the continuously variable transmission 18. In addition, when both the forward clutch C1 and the reverse brake B1 are released, the forward-reverse switching device 16 is placed in a neutral state in which power transmission is cut off (that is, power transmission cut-off state).

Figure 2:
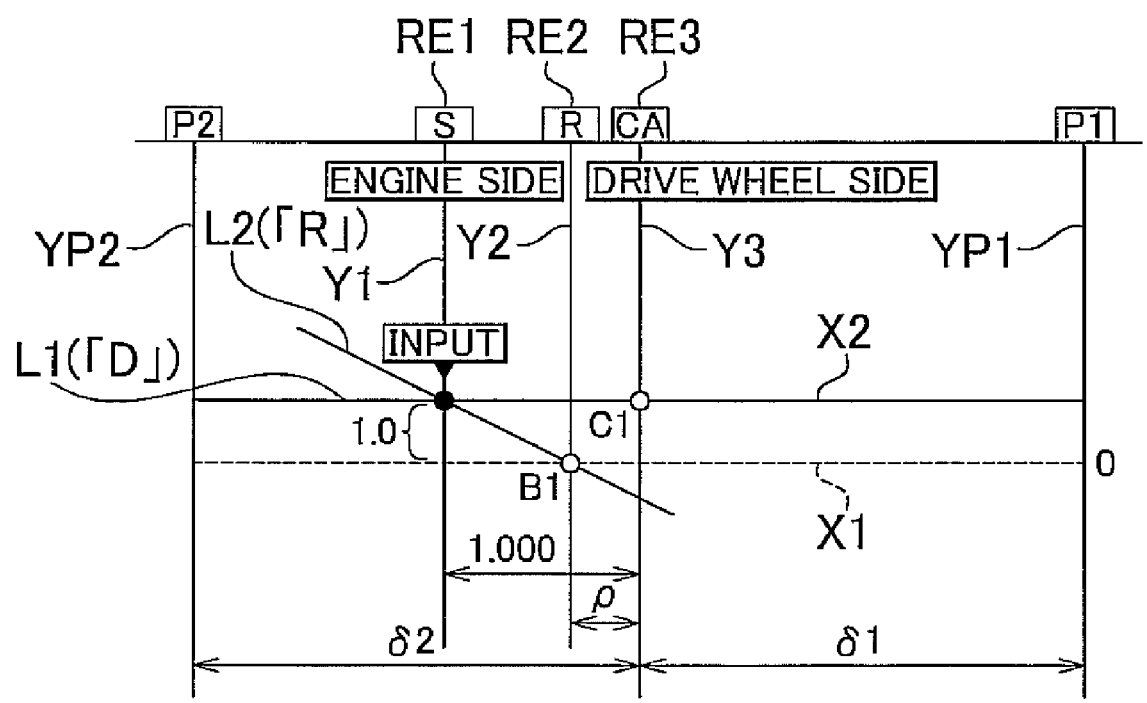
FIG. 2 is a nomograph that can represent the relative relationship among the rotational speeds of rotating elements using straight lines, in which coupled states of the rotating elements are varied among the operating state of a forward clutch and the operating state of a reverse brake in the forward-reverse switching device shown in FIG. 1.

FIG. 2 is a nomograph that can represent the relative relationship among the rotational speeds of the rotating elements using straight lines L (for example, a straight line L1 or a straight line L2), in which coupled states of the rotating elements are varied among the operating states of the forward clutch C1 and reverse brake B1 in the forward-reverse switching device 16. The nomograph shown in FIG. 2 is two-dimensional coordinates formed of the abscissa axis that indicates the relationship among the gear ratio ρ and the gear tooth ratio δ1 (the number of teeth ZS of the sun gear S/the number of teeth ZP1 of each pinion gear P1) and δ2 (the number of teeth ZS of the sun gear S/the number of teeth ZP2 of each pinion gear P2) in the planetary gear set 17 and the ordinate axis that indicates the relative rotational speeds of the rotating elements. Between two horizontal lines, the lower horizontal line (dotted line) X1 represents that the rotational speed is zero, and the upper horizontal line X2 represents that the rotational speed is "1.0", that is, the rotational speed $N_E$ of the engine 12 coupled to the turbine shaft. In FIG. 2, the speed ratio of the torque converter 14 (the rotational speed of the pump impeller 14p/the rotational speed of the turbine impeller 14t) is 1.0.

In addition, in FIG. 2, three vertical lines Y1, Y2 and Y3 corresponding to the three rotating elements of the planetary gear set 17 indicate the relative rotational speed of the sun gear S corresponding to the first rotating element (first element) RE1, the relative rotational speed of the ring gear R corresponding to the second rotating element (second element) RE2 and the relative rotational speed of the carrier CA corresponding to the third rotating element (third element) RE3 in order from the left. The respective intervals between the three vertical lines Y1, Y2 and Y3 are determined on the basis of the gear ratio ρ of the planetary gear set 17. Generally, in the relationship among the vertical lines (that is, the lines that indicate relative rotational speeds as in the case of the above vertical lines) of a nomograph, the interval between the sun gear and the carrier corresponds to "1", and the interval between the carrier and the ring gear corresponds to the gear ratio ρ of the planetary gear set. That is, in the forward-reverse switching device 16, the interval between the vertical line Y1 and the vertical line Y3 set at an interval corresponding to "1", and the interval between the vertical line Y2 and the vertical line Y3 is set at an interval corresponding to the gear ratio ρ.

Furthermore, two vertical lines YP1 and YP2 corresponding to the other two rotating elements of the planetary gear set 17 indicate the relative rotational speed of each first pinion gear P1 and the relative rotational speed of each second pinion gear P2. The interval between the vertical line YP1 and the vertical line YP2 is determined on the basis of the gear tooth ratios δ1 and δ2. In the forward-reverse switching device 16, the interval between the vertical line Y1 and the vertical line Y3 is set at an interval corresponding to "1", the interval between the vertical line Y3 and the vertical line YP1 is set at an interval corresponding to the gear tooth ratio δ1, and the interval between the vertical line Y3 and the vertical line YP2 is set at an interval corresponding to the gear tooth ratio δ2.

When the nomograph shown in FIG. 2 is used, in the forward-reverse switching device 16 according to the first embodiment, the first rotating element RE1 (that is, the sun gear S) is coupled to the engine 12 via the torque converter 14 so that power is transmittable, and the third rotating element RE3 (that is, carrier CA) is coupled to the drive wheels 24 via the continuously variable transmission 18 so that power is transmittable. In addition, the second rotating element RE2 (that is, ring gear R) is selectively coupled to the housing 38 via the reverse brake B1, and the first rotating element RE1 and the third rotating element RE3 are selectively coupled to each other via the forward clutch C1. Then, as indicated by the straight line L2, when the reverse brake B1 is engaged and the forward clutch C1 is released, rotation of the second rotating element RE2 is prohibited to rotate the third rotating element RE3 in the direction opposite to the rotational direction of the first rotating element RE1. By so doing, the forward-reverse switching device 16 forms a reverse power transmission path "R" through which power is transmitted to the rotating elements arranged adjacent to the drive wheels 24 with respect to the forward-reverse switching device 16 in the rotational direction opposite to the rotational direction of the engine 12. On the other hand, as indicated by the straight line L1, when the forward clutch C1 is engaged and the reverse brake B1 is released, the first, second and third rotating elements RE1, RE2 and RE3 are integrally rotated, that is, the planetary gear set 17 is placed in an integrally rotatable state, and the third rotating element RE3 is rotated in the same rotational direction at the same rotational speed as the first rotating element RE1. By so doing, the forward-reverse switching device 16 forms a forward power transmission path "D" through which power is transmitted to the rotating elements arranged adjacent to the drive wheels 24 with respect to the forward-reverse switching device 16 in the same rotational direction as the engine 12. In this way, the forward-reverse switching device 16 has the function of transmitting the rotation at the side of the engine 12 to the rotating elements, such as the continuously variable transmission 18, arranged adjacent to the drive wheels 24 with respect to the forward-reverse switching device 16 in the same rotational direction or in the opposite rotational direction.

Referring back to FIG. 1, the continuously variable transmission 18 includes an input-side variable pulley (that is, a primary pulley or a primary sheave) 42, an output-side variable pulley (that is, a secondary pulley or a secondary sheave) 46 and a transmission belt 48. The input-side variable pulley 42 is an input-side member mounted on the input shaft 36, and has a variable effective diameter. The output-side variable pulley 46 is an output-side member mounted on an output shaft 44, and has a variable effective diameter. The transmission belt 48 is wound around the input-side and output-side variable pulleys 42 and 46. Power is transmitted by friction between the variable pulleys 42 and 46 and the transmission belt 48.

The variable pulley 42 includes a fixed rotary body 42a, a movable rotary body 42b and an input-side hydraulic cylinder (that is, primary hydraulic cylinder) 42c. The fixed rotary body 42a is fixed to the input shaft 36. The movable rotary body 42b is not rotatable around its axis with respect to the input shaft 36 and is axially movable. The input-side hydraulic cylinder 42c serves as a hydraulic actuator that applies thrust for changing the V groove width between the fixed rotary body 42a and the movable rotary body 42b. The variable pulley 46 includes a fixed rotary body 46a, a movable rotary body 46b and an output-side hydraulic cylinder (that is, secondary hydraulic cylinder) 46c. The fixed rotary body 46a is fixed to the output shaft 44. The movable rotary body 46b is not rotatable around its axis with respect to the output shaft 44 and is axially movable. The output-side hydraulic cylinder 46c serves as a hydraulic actuator that applies thrust for changing the V groove width between the fixed rotary body 46a and the movable rotary body 46b. Then, a primary pressure Pin (that is, a shift pressure), which is a hydraulic pressure of the primary hydraulic cylinder 42c, is regulated by the hydraulic pressure control circuit 100. By so doing, the V groove widths of both the variable pulleys 42 and 46 are changed to vary the diameters (that is, effective diameters) of respective portions of both variable pulleys 42 and 46, around which the transmission belt 48 is wound. Thus, the speed ratio γ (=the input shaft rotational speed $N_{IN}$ of the continuously variable transmission 18/the output shaft rotational speed $N_{OUT}$ of the continuously variable transmission 18) is continuously varied. In addition, the secondary pressure Pout (that is, the belt clamping pressure), which is the hydraulic pressure of the secondary hydraulic cylinder 46c, is regulated by the hydraulic pressure control circuit 100 to control belt clamping force so that the transmission belt 48 does not slip.

Figure 3:
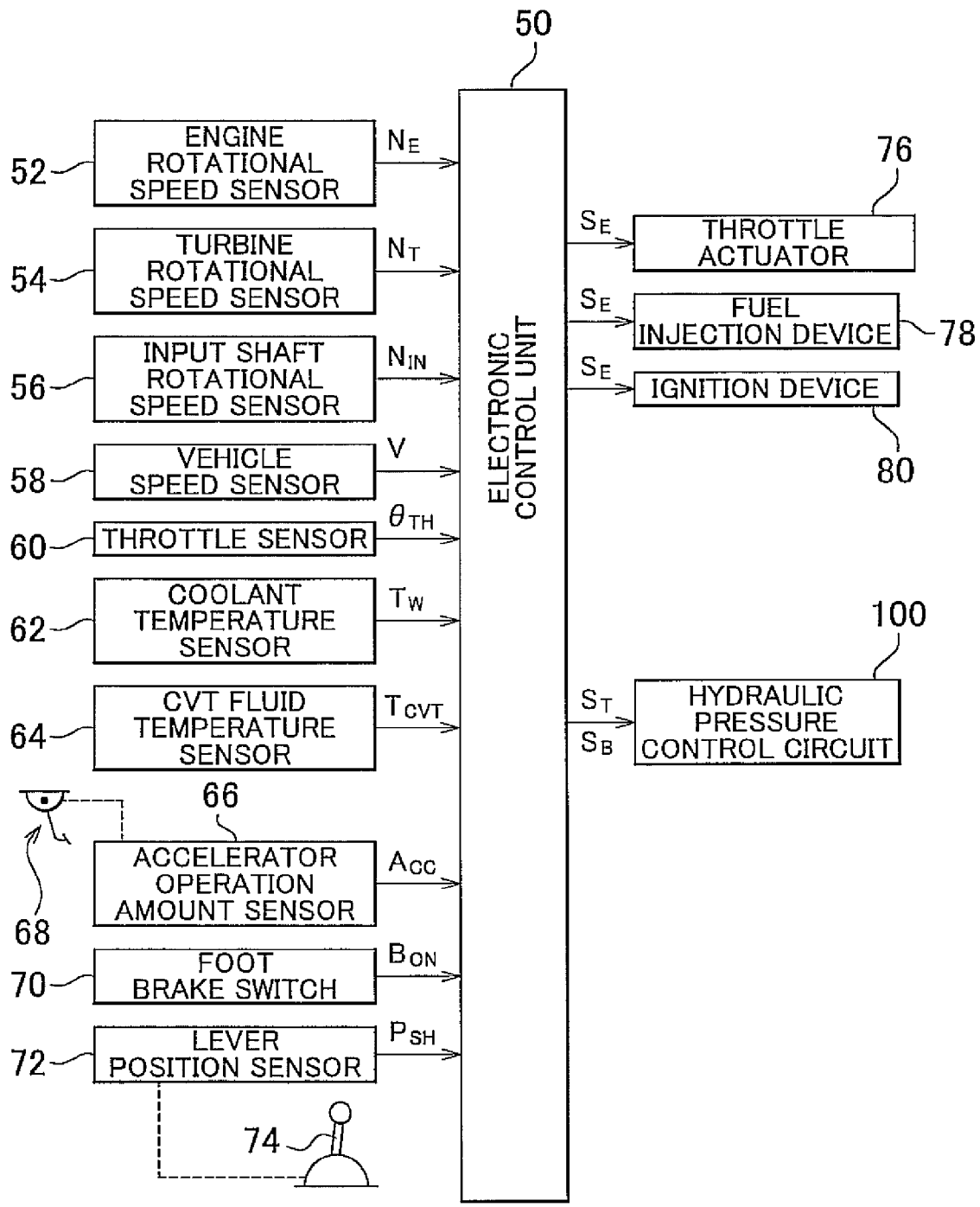
FIG. 3 is a block diagram that illustrates a relevant portion of a control system provided for the vehicle in order to control the vehicle drive train, or the like, shown in FIG. 1.

FIG. 3 is a block diagram that illustrates a relevant portion of a control system provided for the vehicle in order to control the vehicle drive train 10, or the like, shown in FIG. 1. An electronic control unit 50, for example, includes a so-called microcomputer that has a CPU, a RAM, a ROM, an input/output interface, and the like. The CPU uses the temporary storage function of the RAM to carry out signal processing in accordance with a program prestored in the ROM. Thus, the CPU executes output control over the engine 12, shift control over the continuously variable transmission 18, belt clamping force control over the continuously variable transmission 18 and engagement hydraulic pressure control (that is, torque capacity control) over the lock-up clutch 26, and the like. The CPU is formed separately into a CPU for engine control, a CPU for hydraulic pressure control over the continuously variable transmission 18 and the lock-up clutch 26, and the like, where necessary.

The electronic control unit 50 is supplied with a signal that indicates a crankshaft rotational speed, a signal that indicates the rotational speed $N_T$ of the turbine shaft 34 (that is, turbine rotational speed), a signal that indicates the rotational speed $N_{IN}$ of the input shaft 36 (that is, input shaft rotational speed), a vehicle speed signal that indicates a vehicle speed V, a throttle valve opening degree signal that indicates the throttle valve opening degree $θ_{TH}$ of an electronic throttle valve 30, a signal that indicates the coolant temperature $T_W$ of the engine, a signal that indicates the fluid temperature $T_{CVT}$ of the hydraulic circuit of the continuously variable transmission 18, and the like, an accelerator operation amount signal that indicates an accelerator operation amount Acc, a brake operation signal that indicates the presence or absence $B_{ON}$ of operation of a foot brake, an operating position signal that indicates a lever position $P_{SH}$ of a shift lever 74, and the like. The crank shaft rotational speed corresponds to the rotation angle (that is, rotational position) $A_{CR}(°)$ of the crankshaft 13, detected by an engine rotational speed sensor 52 and the rotational speed $N_E$ of the engine 12 (that is, engine rotational speed) $N_E$. The rotational speed of the turbine shaft 34 (turbine rotational speed) $N_T$ is detected by a turbine rotational speed sensor 54. The input shaft rotational speed $N_{IN}$ is detected by an input shaft rotational speed sensor 56 and is input to the continuously variable transmission 18. The vehicle speed V corresponds to the rotational speed $N_{OUT}$ of the output shaft 44 (that is, output shaft rotational speed). The output shaft rotational speed $N_{OUT}$ is detected by a vehicle speed sensor (that is, output shaft rotational speed sensor) 58 and is output from the continuously variable transmission 18. The throttle valve opening degree signal is detected by a throttle sensor 60. The electronic throttle valve 30 is provided in an intake pipe 32 of the engine 12 (see FIG. 1). The coolant temperature $T_W$ of the engine 12 is detected by a coolant temperature sensor 62. The fluid temperature $T_{CVT}$ is detected by a CVT fluid temperature sensor 64. The accelerator operation amount Acc is the amount by which an accelerator pedal 68 is operated, and is detected by an accelerator operation amount sensor 66. The brake operation signal is detected by a foot brake switch 70. The foot brake is a service brake. The operating position signal is detected by a lever position sensor 72.

In addition, the electronic control unit 50, for example, outputs a throttle signal, an injection signal, an ignition timing signal, and the like, as engine output control command signals $S_E$ for output control over the engine 12. The throttle signal is used to drive a throttle actuator 76 for open-close control over the electronic throttle valve 30. The injection signal is used to control the flow rate of fuel injected from a fuel injection device 78. The ignition timing signal is used to control the ignition timing at which the engine 12 is ignited by an ignition device 80. In addition, the electronic control unit 50, for example, outputs a command signal for driving a linear solenoid valve SLP as a shift control command signal $S_T$, a command signal for driving a linear solenoid valve SLS as a clamping force control command signal $S_B$, a command signal for driving a linear solenoid valve SLT, and the like, to the hydraulic pressure control circuit 100. The linear solenoid valve SLP regulates the primary pressure Pin applied to the primary hydraulic cylinder 42c. The shift control command signal $S_T$ is used to vary the speed ratio γ of the continuously variable transmission 18. The linear solenoid valve SLS regulates the secondary pressure Pout. The clamping force control command signal $S_B$ is used to regulate the clamping force of the transmission belt 48. The linear solenoid valve SLT controls a line hydraulic pressure $P_L$, which will be described later.

The shift lever 74 is, for example, arranged in proximity to a driver seat, and is manually operated to any one of five lever positions "P", "R", "N", "D" and "L" that are sequentially arranged.

The "P" position (range) is a park position that gives a neutral state where a power transmission path of the vehicle drive train 10 is released, that is, power transmission of the vehicle drive train 10 is cut off, and rotation of the output shaft 44 is mechanically locked by a mechanical parking mechanism. The "R" position is a reverse travel position in which the rotational direction of the output shaft 44 is reversed. The "N" position is a neutral position that gives a neutral state in which power transmission of the vehicle drive train 10 is cut off. The "D" position is a forward travel position in which an automatic shift mode is established within a shift range that allows the continuously variable transmission 18 to shift speeds to thereby execute automatic shift control. The "L" position is an engine brake position in which strong engine brake is applied. In this way, the "P" position and the "N" position are non-travel positions that are selected when the vehicle is not caused to drive, and the "R" position, the "D" position and the "L" position are travel positions that are selected when the vehicle is caused to drive.

Figure 4:
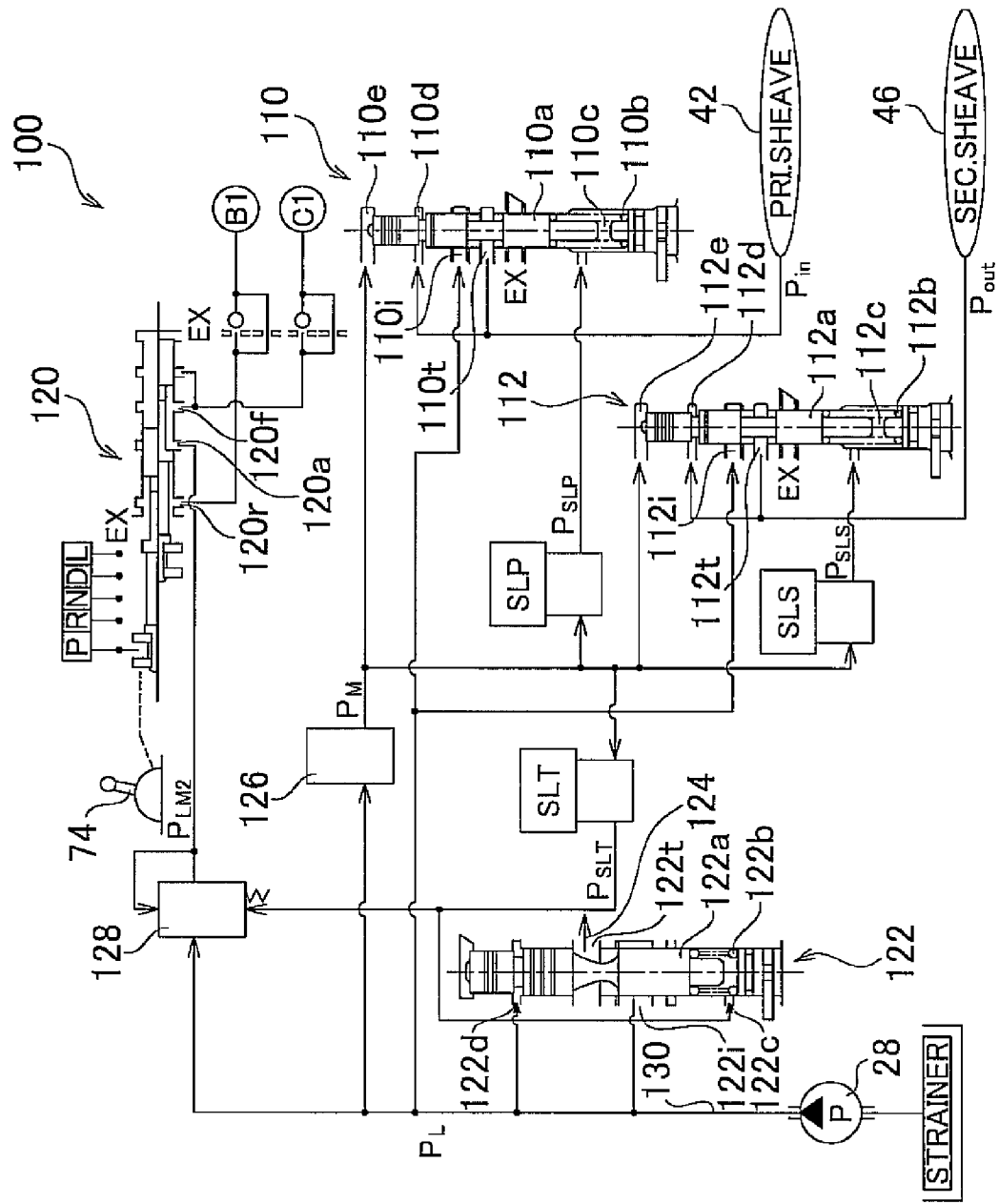
FIG. 4 is a hydraulic pressure circuit diagram that shows a relevant portion of a hydraulic pressure control circuit, related to belt clamping force control and speed ratio control over a continuously variable transmission, and engagement hydraulic pressure control over the forward clutch and the reverse brake associated with operation of a shift lever.

FIG. 4 is a hydraulic pressure control diagram that shows a relevant portion of the hydraulic pressure control circuit 100, related to belt clamping force control and speed ratio control over the continuously variable transmission 18, and engagement hydraulic pressure control over the forward clutch C1 and the reverse brake B1 associated with operation of the shift lever 74. In FIG. 4, the hydraulic pressure control circuit 100 includes a speed ratio control valve 110, a clamping force control valve 112, a manual valve 120, and the like. The speed ratio control valve 110 serves as a shift control valve and regulates the primary pressure Pin so that the speed ratio γ is continuously varied. The clamping force control valve 112 regulates the secondary pressure Pout so that the transmission belt 48 does not slip. A fluid passage of the manual valve 120 is mechanically switched in accordance with operation of the shift lever 74 so that the forward clutch C1 and the reverse brake B1 are engaged or released.

The line hydraulic pressure $P_L$ is regulated to a value corresponding to an engine load, and the like, by, for example, a relief-type primary regulator valve (line hydraulic pressure regulating valve) 122 on the basis of a control hydraulic pressure $P_{SLT}$, which is an output hydraulic pressure of the linear solenoid valve SLT, using the working hydraulic pressure output from (generated by) the oil pump 28 as a source pressure.

More specifically, the primary regulator valve 122 includes a spool valve element 122a, a spring 122b, a fluid chamber 122c, and a fluid chamber 122d. The spool valve element 122a is axially movable, so the spool valve element 122a opens or closes an input port 122i to drain the working hydraulic pressure, generated by the oil pump 28, to a drain fluid passage 124 via a fluid passage 130 and an output port 122t. The spring 122b serves as urging means that urges the spool valve element 122a in a valve closing direction. The fluid chamber 122c accommodates the spring 122b, and receives the control hydraulic pressure $P_{SLT}$ in order to apply thrust in the valve closing direction to the spool valve element 122a. The fluid chamber 122d receives the working hydraulic pressure, generated by the oil pump 28, via the fluid passage 130 in order to apply thrust in the valve opening direction to the spool valve element 122a.

In the thus configured primary regulator valve 122, when the urging force of the spring 122b is $F_S$, the pressure receiving area in which the control hydraulic pressure $P_{SLT}$ is received in the fluid chamber 122c is a, and the pressure receiving area in which the line hydraulic pressure $P_L$ is received in the fluid chamber 122d is b, it reaches equilibrium in the following equation (1). Thus, the line hydraulic pressure $P_L$ is expressed by the following equation (2), and is directly proportional to the control hydraulic pressure $P_{SLT}$. In this way, the primary regulator valve 122 and the linear solenoid valve SLT each function as a pressure regulating device that regulates working fluid, discharged from the oil pump 28, to the line hydraulic pressure $P_L$ on the basis of the line hydraulic pressure control command signal $S_{PL}$ as a hydraulic pressure command value.

$$P_L \times b = P_{SLT} \times a + F_S \quad (1)$$

$$P_L = P_{SLT} \times (a/b) + F_S/b \quad (2)$$

A modulator hydraulic pressure $P_M$ is a source pressure of the control hydraulic pressure $P_{SLT}$, the control hydraulic pressure $P_{SLP}$ and the control hydraulic pressure $P_{SLS}$. The control hydraulic pressure $P_{SLT}$ is controlled by the electronic control unit 50. The control hydraulic pressure $P_{SLP}$ is the output hydraulic pressure of the linear solenoid valve SLP. The control hydraulic pressure $P_{SLS}$ is the output hydraulic pressure of the linear solenoid valve SLS. The modulator hydraulic pressure $P_M$ is regulated to a predetermined pressure by a modulator valve 126 using the line hydraulic pressure $P_L$ as a source pressure. In addition, an output hydraulic pressure $P_{LM2}$ is regulated by a second line pressure modulator valve 128 on the basis of the control hydraulic pressure $P_{SLT}$ using the line hydraulic pressure $P_L$ as a source pressure.

In the manual valve 120, the output hydraulic pressure $P_{LM2}$ is supplied to the input port 120a. Then, when the shift lever 74 is operated to the "D" position or the "L" position, the fluid passage of the manual valve 120 is switched so that the output hydraulic pressure $P_{LM2}$ is supplied to the forward clutch C1 via a forward output port 120f as a forward travel output pressure and the working fluid in the reverse brake B1 is drained to, for example, atmospheric pressure from a reverse output port 120r via a drain port EX. By so doing, the forward clutch C1 is engaged and the reverse brake B1 is released.

In addition, when the shift lever 74 is operated to the "R" position, the fluid passage of the manual valve 120 is switched so that the output hydraulic pressure $P_{LM2}$ is supplied to the reverse brake B1 via the reverse output port 120r as a reverse travel output pressure and the working fluid in the forward clutch C1 is drained from the forward output port 120f to, for example, atmospheric pressure via the drain port EX. By so doing, the reverse brake B1 is engaged, and the forward clutch C1 is released.

In addition, when the shift lever 74 is operated to the "P" position or the "N" position, the fluid passage of the manual valve 120 is switched so that the fluid passage from the input port 120a to the forward output port 120f and the fluid passage from the input port 120a to the reverse output port 120r both are shut off and both the working fluid in the forward clutch C1 and the working fluid in the reverse brake B1 are drained from the manual valve 120. By so doing, the forward clutch C1 and the reverse brake B1 both are released.

The speed ratio control valve 110 includes a spool valve element 110a, a spring 110b, a fluid chamber 110c, a feedback fluid chamber 110d and a fluid chamber 110e. The spool valve element 110a is axially movable, so the spool valve element 110a opens or closes an input port 110i to thereby make it possible to supply the line hydraulic pressure $P_L$ from the input port 110i to a primary pulley 42 via an output port 110t. The spring 110b serves as urging means that urges the spool valve element 110a in the valve opening direction. The fluid chamber 110c accommodates the spring 110b and receives the control hydraulic pressure $P_{SLS}$ in order to apply thrust in the valve opening direction to the spool valve element 110a. The feedback fluid chamber 110d receives the line hydraulic pressure $P_L$, output from the output port 110t, in order to apply thrust in the valve closing direction to the spool valve element 110a. The fluid chamber 110e receives the modulator hydraulic pressure $P_M$ in order to apply thrust in the valve closing direction to the spool valve element 110a.

In the thus configured speed ratio control valve 110, the line hydraulic pressure $P_L$ is continuously regulated using the control hydraulic pressure $P_{SLP}$ as a pilot pressure so as to obtain a target input shaft rotational speed $N_{IN}^*$. By so doing, the primary pressure Pin is output from the output port 110t. In this way, the speed ratio control valve 110 and the linear solenoid valve SLP that outputs the control hydraulic pressure $P_{SLP}$ for operating the speed ratio control valve 110 function as a primary pressure regulating device for regulating the primary pressure Pin in order to cause the continuously variable transmission 18 to shift speeds. Then, when the control hydraulic pressure $P_{SLP}$ is increased, the line hydraulic pressure $P_L$, which is input to the speed ratio control valve 110 and is a source pressure of the primary pressure Pin, is supplied to the primary hydraulic cylinder 42$c$, the primary pressure Pin is increased as the control hydraulic pressure $P_{SLP}$ increases in accordance with the control hydraulic pressure $P_{SLP}$. Thus, the V groove width of the primary pulley 42 is narrowed to decrease the speed ratio γ, that is, the continuously variable transmission 18 upshifts. In addition, when the control hydraulic pressure $P_{SLP}$ is decreased, the working fluid of the primary hydraulic cylinder 42$c$ is drained from the output port 110$t$ via the drain port EX, and the primary pressure Pin is decreased as the control hydraulic pressure $P_{SLP}$ decreases in accordance with the control hydraulic pressure $P_{SLP}$. Thus, the V groove width of the primary pulley 42 is widened to increase the speed ratio γ, that is, the continuously variable transmission 18 downshifts. In addition, the line hydraulic pressure $P_L$ is a source pressure of the primary pressure Pin.

Figure 5:
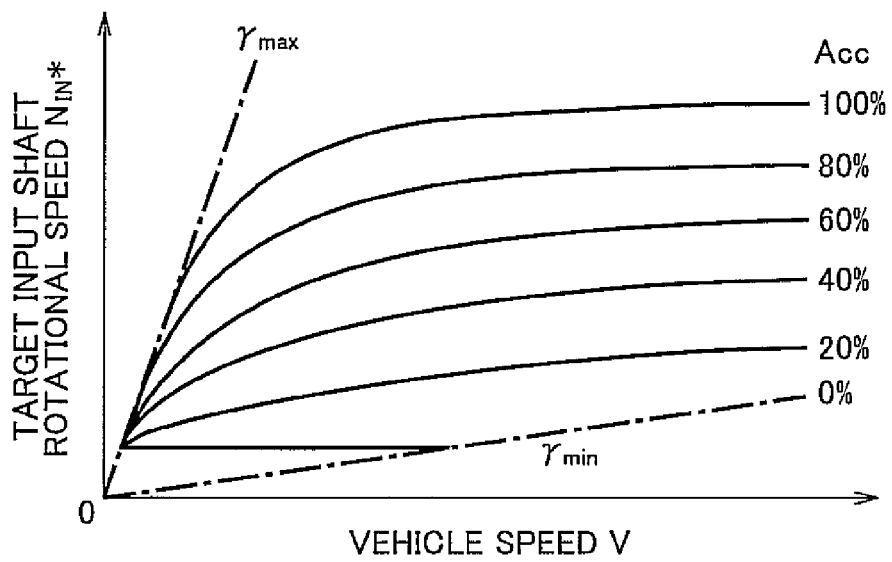
FIG. 5 is a view that illustrates an example of a shift map used to obtain a target input rotational speed in shift control over the continuously variable transmission.

For example, as shown in FIG. 5, when shift control is executed so that an actual input shaft rotational speed $N_{IN}$ reaches a target input shaft rotational speed $N_{IN}*$, a shift control command signal $S_T$ is adjusted to cause the continuously variable transmission 18 to shift speeds. The target input shaft rotational speed $N_{IN}*$ is set on the basis of a vehicle state indicated by an actual vehicle speed V and an accelerator operation amount Acc by referring to a prestored relationship (shift map) between the vehicle speed V and the target input shaft rotational speed $N_{IN}*$ using the accelerator operation amount Acc as a parameter. The target input shaft rotational speed $N_{IN}*$ is a target input rotational speed of the continuously variable transmission 18. The shift control command signal $S_T$ is a controlled amount of the primary pressure regulating device. That is, as the primary pressure Pin applied to the primary hydraulic cylinder 42$c$ is regulated, the V groove widths of both variable pulleys 42 and 46 are varied. By so doing, the speed ratio γ is continuously varied through, for example, feedback control. The shift map shown in FIG. 5 corresponds to a shift condition. In the shift map, the target input shaft rotational speed $N_{IN}*$ is set so as to increase the speed ratio γ as the vehicle speed V decreases and the accelerator operation amount Acc increases. In addition, the vehicle speed V corresponds to the output shaft rotational speed $N_{OUT}$, so the target input shaft rotational speed $N_{IN}*$, which is a target value of the input shaft rotational speed $N_{IN}$, corresponds to a target speed ratio γ* (=$N_{IN}*/N_{OUT}$). Then, the speed ratio γ is determined within the range of the minimum speed ratio (highest gear ratio) γmin and maximum speed ratio (lowest gear ratio) γmax of the continuously variable transmission 18.

The clamping force control valve 112 includes a spool valve element 112$a$, a spring 112$b$, a fluid chamber 112$c$, a feedback fluid chamber 112$d$ and a fluid chamber 112$e$. The spool valve element 112$a$ opens or closes an input port 112$i$ to make it possible to supply the line hydraulic pressure $P_L$ from the input port 112$i$ to a secondary pulley 46 via an output port 112$t$ as the secondary pressure Pout. The spring 112$b$ serves as urging means that urges the spool valve element 112$a$ in the valve opening direction. The fluid chamber 112$c$ accommodates the spring 112$b$, and receives the control hydraulic pressure $P_{SLS}$ that applies thrust in the valve opening direction to the spool valve element 112$a$. The feedback fluid chamber 112$d$ receives the secondary pressure Pout, output from the output port 112$t$, in order to apply thrust in the valve closing direction to the spool valve element 112$a$. The fluid chamber 112$e$ receives the modulator hydraulic pressure $P_M$ in order to apply thrust in the valve closing direction to the spool valve element 112$a$.

In the thus configured clamping force control valve 112, the line hydraulic pressure $P_L$ is continuously regulated using the control hydraulic pressure $P_{SLS}$ as a pilot pressure so that the transmission belt 48 does not slip. By so doing, the secondary pressure Pout is output from the output port 112$t$. In this way, the clamping force control valve 112 and the linear solenoid valve SLS that outputs the control hydraulic pressure $P_{SLS}$ for operating the clamping force control valve 112 function as a secondary pressure regulating device for regulating the secondary pressure Pout. Then, when the control hydraulic pressure $P_{SLS}$ is output, the line hydraulic pressure $P_L$, which is a source pressure of the secondary pressure Pout and is input to the clamping force control valve 112, is supplied to the secondary hydraulic cylinder 46$c$. Thus, the secondary pressure Pout is increased as the control hydraulic pressure $P_{SLS}$ increases in accordance with the control hydraulic pressure $P_{SLS}$ to thereby increase belt clamping force. In addition, the line hydraulic pressure $P_L$ is a source pressure of the secondary pressure Pout.

Figure 6:
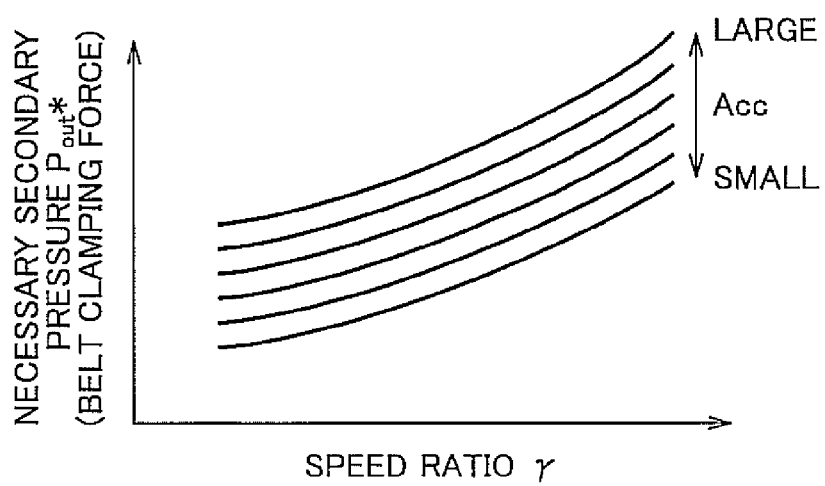
FIG. 6 is a view that shows an example of a belt clamping force map by which a necessary secondary pressure is obtained depending on a speed ratio, and the like, in clamping force control over the continuously variable transmission.

FIG. 6 shows the relationship (belt clamping force map) between a speed ratio γ and a necessary secondary pressure Pout* corresponding to belt clamping force using an accelerator operation amount Acc (or a throttle valve opening degree $θ_{TH}$, an input torque $T_{IN}$ to the continuously variable transmission 18, and the like) corresponding to transmission torque as a parameter. The relationship is empirically obtained in advance and stored so that a belt slip does not occur. For example, using the relationship shown in FIG. 6, the necessary secondary pressure Pout* is determined (that is, calculated) on the basis of a vehicle state indicated by an actual speed ratio γ and an accelerator operation amount Acc. On the basis of the determined necessary secondary pressure Pout*, the clamping force control command signal $S_B$ is regulated (that is, continuously set) to regulate the secondary pressure Pout so that the transmission belt 48 does not slip. The clamping force control command signal $S_B$ is a controlled amount of the secondary pressure regulating device. Then, frictional force (that is, belt clamping force) between the variable pulleys 42 and 46 and the transmission belt 48 is increased or decreased in accordance with the regulated secondary pressure Pout.

Here, when the vehicle is being towed in the forward direction so that the drive wheels 24 are driven for rotation by a road surface, the third rotating element RE3 (carrier CA) is driven for rotation by torque from the drive wheels 24. At this time, when rotation of the engine 12 is stopped, rotation of the first rotating element RE1 (sun gear S) is also stopped. Therefore, as is apparent from the nomograph shown in FIG. 2, the first and second pinion gears P1 and P2 are driven for rotation (that is, rotate) at rotational speeds that are respectively δ1 and δ2 (the above gear tooth ratios) times as high as the rotational speed of the third rotating element RE3 (carrier CA). The rotational speed of each first pinion gear P1 (or each second pinion gear P2) at this time is determined by multiplying the rotational speed of each drive wheel 24 by the gear ratio (for example, a reduction ratio or a final gear ratio) of the reduction gear 20, the gear ratio γ (for example, maximum speed ratio γmax for starting the vehicle) of the continuously variable transmission 18, the above gear tooth ratio δ1 (or δ2), and the like, so there is a possibility that the rotational speed of each first pinion gear P1 (or each second pinion gear P2)

becomes a high rotational speed of about several tens of thousands (rpm) depending on a vehicle speed at which the vehicle is being towed. In addition, when rotation of the engine 12 is stopped, various portions in the vehicle drive train 10 are not forcibly supplied with lubricating oil that uses working hydraulic pressure generated by the oil pump 28 as a source pressure. Therefore, durability of the first and second pinion gears P1 and P2 may particularly decrease when the vehicle is being towed.

Then, the forward-reverse switching device according to the present embodiment includes a one-way clutch F1. The one-way clutch F1 is coupled to the planetary gear set between any two rotating elements among the first, second and third rotating elements RE1, RE2 and RE3. The one-way clutch F1 is engaged when the rotational speed of the third rotating element RE3 exceeds the rotational speed of the first rotating element RE1 (that is, when a driving force transmission element is driven not by the driving force source but by the drive wheels). The one-way clutch F1 idles when the rotational speed of the third rotating element RE3 does not exceed the rotational speed of the first rotating element RE1. That is, the one-way clutch F1 transmits torque from the third rotating element RE3 to the first rotating element RE1 when the rotational speed of the third rotating element RE3 is higher than the rotational speed of the first rotating element RE1; whereas, the one-way clutch F1 idles when the rotational speed of the third rotating element RE3 is lower than the rotational speed of the first rotating element RE1. In the case where the forward-reverse switching device is the forward-reverse switching device 16 according to the first embodiment, when the driving force transmission element is driven not by the driving force source but by the drive wheels, the rotational speed of the third rotating element RE3 exceeds the rotational speed of the first rotating element RE1, and the rotational speed of the third rotating element RE3 exceeds the rotational speed of the second rotating element RE2. In addition, in the case where the forward-reverse switching device is the forward-reverse switching device 16 according to the first embodiment, when the rotational speed of the third rotating element RE3 does not exceed the rotational speed of the first rotating element RE1, the rotational speed of the third rotating element RE3 does not exceed the rotational speed of the second rotating element RE2. Note that in the first to fourth embodiments, the rotational speed is compared on the assumption that the rotational direction of the engine 12 is positive. Thus, when the rotational direction is opposite to the rotational direction of the engine 12, the engine rotational speed $N_E$ is a higher rotational speed even when the absolute value of that rotational speed is larger than the engine rotational speed $N_E$.

In the thus configured forward-reverse switching device 16, in the case where the planetary gear set 17 is driven for rotation by torque from the drive wheels 24 when rotation of the engine 12 is stopped, that is, the third rotating element RE3 is driven for rotation by torque from the drive wheels 24 when rotation of the first rotating element RE1 is stopped, the rotational speed of the third rotating element RE3 tends to exceed the rotational speed of the first rotating element RE1 (or the second rotating element RE2), so the one-way clutch F1 is engaged, that is, torque is transmitted to integrally rotate the planetary gear set 17 consequently. When the planetary gear set 17 is integrally rotated, the first and second pinion gears P1 and P2 revolve; however, the relative rotations of the first and second pinion gears P1 and P2 with respect to the carrier CA, that is, rotations of the first and second pinion gears P1 and P2 on their axes, do not occur. This prevents the first and second pinion gears P1 and P2 from rotating at a high speed. Thus, when the vehicle is being towed in a state where rotation of the engine 12 is stopped, the one-way clutch F1 is engaged to place the planetary gear set 17 in an integrally rotatable state. This prevents an increase in rotational speed at which each of the first and second pinion gears P1 and P2 rotates on their axes irrespective of a vehicle speed V at which the vehicle is being towed.

On the other hand, in the forward-reverse switching device 16 according to the first embodiment, when the vehicle is normally driven so that the first rotating element RE1 is driven for rotation by torque from the engine 12 and any one of the forward clutch C1 and the reverse brake B1 is engaged, as is apparent from the nomograph shown in FIG. 2, the rotational speed of the third rotating element RE3 does not exceed the rotational speed of the first rotating element RE1. Thus, even when the forward-reverse switching device 16 is equipped with the above described one-way clutch F1, the one-way clutch F1 idles when the vehicle is normally driven.

Note that the relative relationship among the rotational speeds of the first, second and third rotating elements RE1, RE2 and RE3 are represented by the straight lines L, so the ratio in rotational speed between the third rotating element RE3 and the first rotating element RE1 in the description of operation of the above one-way clutch F1 may be replaced with the ratio in rotational speed between the third rotating element RE3 and the second rotating element RE2 or the ratio in rotational speed between the second rotating element RE2 and the first rotating element RE1.

Figure 7:
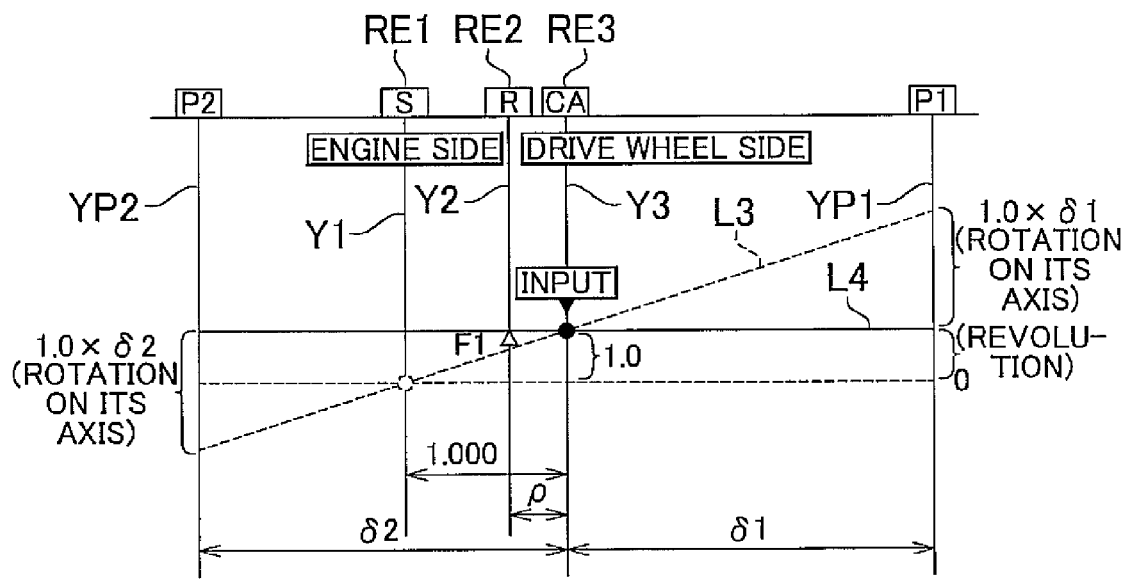
FIG. 7 is a nomograph, corresponding to the nomograph of FIG. 2, in the forward-reverse switching device when there is torque input from drive wheels when the vehicle is being towed in the forward direction according to the first embodiment of the invention.

The one-way clutch F1 shown in FIG. 1 is an example of the one-way clutch F1 that has the above described function. In addition, FIG. 7 is a nomograph in the forward-reverse switching device 16 when there is torque from the drive wheels 24 when the vehicle is being towed in the forward direction. Note that the broken line L3 in FIG. 7 indicates an example in which no one-way clutch F1 is provided. As shown in FIG. 1, the one-way clutch F1 is coupled to the planetary gear set 17 between the second rotating element (ring gear R) and the third rotating element (carrier CA). The one-way clutch F1 is engaged when the rotational speed of the carrier CA exceeds the rotational speed of the ring gear R; whereas the one-way clutch F1 idles when the rotational speed of the carrier CA does not exceed the rotational speed of the ring gear R. That is, the one-way clutch F1 transmits torque from the carrier CA to the ring gear R when the rotational speed of the carrier CA is higher than the rotational speed of the ring gear R; whereas the one-way clutch F1 idles when the rotational speed of the carrier CA is lower than the rotational speed of the ring gear R.

In the thus configured forward-reverse switching device 16, when the vehicle is being towed in the forward direction in a state where rotation of the engine 12 is stopped, the rotational speed of the carrier CA that is driven for rotation in a state where rotation of the sun gear S is stopped tends to exceed the rotational speed of the ring gear R as indicated by the broken line L3 in FIG. 7; however, the one-way clutch F1 is engaged to integrally rotate the planetary gear set 17. Then, as indicated by the solid line L4 in FIG. 7, the first and second pinion gears P1 and P2 revolve but do not rotate on their axes. This prevents the first and second pinion gears P1 and P2 from rotating at a high speed. On the other hand, when any one of the forward clutch C1 and the reverse brake B1 is engaged while the sun gear S is driven for rotation by torque from the engine 12, the rotational speed of the carrier CA does not exceed the rotational speed of the ring gear R. Thus, the one-way clutch F1 idles when the vehicle is normally driven.

As described above, in the first embodiment, the forward-reverse switching device 16 includes the planetary gear set 17 that has three rotating elements, that is, the sun gear S, the carrier CA and the ring gear R. The ring gear R is in mesh with the sun gear S via the first and second pinion gears P1 and P2. The forward-reverse switching device 16 is equipped with the one-way clutch F1. The one-way clutch F1 is coupled to the planetary gear set 17 between two rotating elements among the first, second and third rotating elements RE1, RE2 and RE3. The one-way clutch F1 is engaged when the rotational speed of the third rotating element RE3 exceeds the rotational speed of the first rotating element RE1; whereas the one-way clutch F1 idles when the rotational speed of the third rotating element RE3 does not exceed the rotational speed of the first rotating element RE1. For example, the one-way clutch F1 of the forward-reverse switching device 16 according to the first embodiment is coupled to the planetary gear set 17 between the second rotating element (ring gear R) and the third rotating element (carrier CA). The one-way clutch F1 is engaged when the rotational speed of the carrier CA exceeds the rotational speed of the ring gear R; whereas the one-way clutch F1 idles when the rotational speed of the carrier CA does not exceed the rotational speed of the ring gear R. Thus, when the vehicle is being towed in a state where rotation of the engine 12 is stopped, the one-way clutch F1 is engaged to place the planetary gear set 17 in an integrally rotatable state. This prevents an increase in rotational speed at which each of the first and second pinion gears P1 and P2 rotates on its axis irrespective of a vehicle speed V at which the vehicle is being towed. Thus, when the vehicle is being towed, it is possible to ensure durability of the first and second pinion gears P1 and P2. On the other hand, in the forward-reverse switching device 16 according to the first embodiment, when the vehicle is normally driven so that the sun gear S is driven for rotation by torque from the engine 12 and any one of the forward clutch C1 and the reverse brake B1 is engaged, the one-way clutch F1 idles, and the one-way clutch F1 does not influence the function of the forward-reverse switching device 16. Thus, the function of the forward-reverse switching device 16 appropriately works.

In addition, with the first embodiment, the planetary gear set 17 is a double pinion type planetary gear set, the first rotating element RE1 is the sun gear S, the second rotating element RE2 is the ring gear R, and the third rotating element RE3 is the carrier CA. By so doing, when the carrier CA of the planetary gear set 17 is driven for rotation by torque from the drive wheels 24 in a state where rotation of the engine 12 is stopped, that is, in a state where rotation of the sun gear S is stopped, the rotational speed of the carrier CA tends to exceed the rotational speed of the sun gear S, so the one-way clutch F1 is engaged to integrally rotate the planetary gear set 17. On the other hand, when the sun gear S of the planetary gear set 17 is driven for rotation by torque from the engine 12, the function of the forward-reverse switching device 16 that selectively switches the rotational direction of the carrier CA between the same direction and the opposite direction with respect to the rotational direction of the sun gear S appropriately works.

In addition, with the first embodiment, the forward-reverse switching device 16 includes the brake B1 and the clutch C1. The brake B1 selectively couples the ring gear R to the housing 38. The clutch C1 selectively couples the sun gear S to the carrier CA. When the brake B1 is engaged and the clutch C1 is released, rotation of the ring gear R is prohibited to form the reverser power transmission path through which power is transmitted to the drive wheels 24 in the rotational direction opposite to the rotational direction of the engine 12. On the other hand, when the clutch C1 is engaged and the brake B1 is released, the planetary gear set 17 is placed in an integrally rotatable state to form the forward power transmission path through which power is transmitted to the drive wheels 24 in the same rotational direction as the engine 12. By so doing, in the planetary gear set 17 having three rotating elements and the forward-reverse switching device 16 having the brake B1 and the clutch C1, when the sun gear S is driven for rotation by torque from the engine 12, the carrier CA is driven for rotation in the rotational direction opposite to the rotational direction of the sun gear S when the reverse power transmission path is formed, so the one-way clutch F1 idles. In addition, when the forward power transmission path is formed and the first, second and third rotating elements RE1, RE2 and RE3 are integrally rotated, the carrier CA is driven for rotation in the same direction at the same rotational speed as the sun gear S, so the one-way clutch F1 idles. In this way, when the first rotating element RE1 of the planetary gear set 17 is driven for rotation by torque from the engine 12, the function of the forward-reverse switching device 16 that selectively switches between the forward power transmission path and the reverse power transmission path appropriately works.

In addition, with the first embodiment, the third rotating element RE3 is coupled to the drive wheels 24 via the continuously variable transmission 18, and lubricating oil is supplied to the forward-reverse switching device 16 by the oil pump 28. The oil pump 28 is driven for rotation by the engine 12 to generate working hydraulic pressure that is a source pressure for carrying out shift operation of the continuously variable transmission 18. By so doing, in the practical vehicle drive train 10 equipped with the continuously variable transmission 18, when the vehicle is being towed in a state where rotation of the engine 12 is stopped, the one-way clutch F1 is engaged to place the planetary gear set 17 in an integrally rotatable state. This prevents an increase in rotational speed at which each of the first and second pinion gears P1 and P2 rotates on its axis irrespective of a vehicle speed V at which the vehicle is being towed. Thus, when the vehicle is being towed, that is, when rotation of the engine 12 is stopped and no lubricating oil that uses working hydraulic pressure generated by the oil pump 28 as a source pressure is forcibly supplied, it is possible to ensure durability of the first and second pinion gears P1 and P2. In addition, when the planetary gear set 17 is driven for rotation by torque from the engine 12, the forward-reverse switching device 16 is appropriately operated.

In addition, with the first embodiment, in the practical vehicle drive train 10 equipped with the continuously variable transmission 18, when the vehicle is being towed, that is, when rotation of the engine 12 is stopped and no lubricating oil that uses working hydraulic pressure generated by the oil pump 28 as a source pressure is forcibly supplied, it is possible to ensure durability of the first and second pinion gears P1 and P2. In addition, when the planetary gear set 17 is driven for rotation by torque from the engine 12, the forward-reverse switching device 16 is appropriately operated.

Next, second to fourth embodiments of the invention will be described. Note that, in the following description, like reference numerals denote substantially similar components among the embodiments, and the description thereof is omitted.

Figure 8:
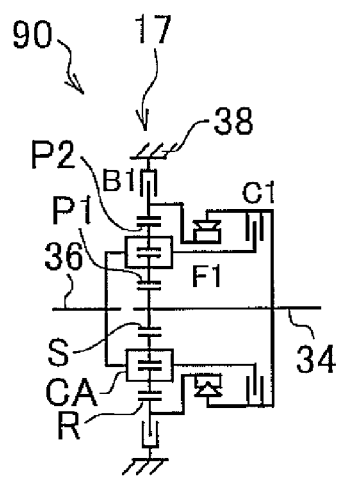
FIG. 8 is a skeleton view that shows a forward-reverse switching device for a vehicle, equipped for the vehicle drive train of FIG. 1, according to a second embodiment.

In the above described first embodiment, the one-way clutch F1 is coupled to the planetary gear set 17 between the second rotating element (ring gear R) and the third rotating element (carrier CA). Instead, in the second embodiment, as shown by a forward-reverse switching device 90 in FIG. 8, the one-way clutch F1 is coupled to the planetary gear set 17 between the first rotating element (sun gear S) and the second rotating element (ring gear R). Then, the one-way clutch F1 is engaged when the rotational speed of the ring gear R exceeds the rotational speed of the sun gear S; whereas the one-way clutch F1 idles when the rotational speed of the ring gear R does not exceed the rotational speed of the sun gear S. That is, the one-way clutch F1 transmits torque from the ring gear R to the sun gear S when the rotational speed of the ring gear R is higher than the rotational speed of the sun gear S; whereas the one-way clutch F1 idles when the rotational speed of the ring gear R is lower than the rotational speed of the sun gear S.

In the thus configured forward-reverse switching device 90, when the vehicle is being towed in the forward direction in a state where rotation of the engine 12 is stopped, the rotational speed of the ring gear R, which increases as the carrier CA is driven for rotation, tends to exceed the rotational speed of the sun gear S of which rotation is stopped; however, the one-way clutch F1 is engaged, so the planetary gear set 17 is integrally rotated. Then, as in the case of the above described first embodiment, the first and second pinion gears P1 and P2 revolve but do not rotate on their axes. This prevents the first and second pinion gears P1 and P2 from rotating at a high speed. On the other hand, when any one of the forward clutch C1 and the reverse brake B1 is engaged while the sun gear S is driven for rotation by torque from the engine 12, the rotational speed of the ring gear R does not exceed the rotational speed of the sun gear S. Thus, the one-way clutch F1 idles when the vehicle is normally driven.

With the second embodiment, similar advantageous effects to those of the above described first embodiment may be obtained. In addition, the one-way clutch F1 is coupled to the planetary gear set 17 between the first rotating element (sun gear S) and the second rotating element (ring gear R). The one-way clutch F1 is engaged when the rotational speed of the ring gear R exceeds the rotational speed of the sun gear S; whereas the one-way clutch F1 idles when the rotational speed of the ring gear R does not exceed the rotational speed of the sun gear S. Thus, as in the case of the above described first embodiment, when the vehicle is being towed in a state where rotation of the engine 12 is stopped, the one-way clutch F1 is engaged to place the planetary gear set 17 in an integrally rotatable state. This prevents an increase in rotational speed at which each of the first and second pinion gears P1 and P2 rotates on its axis irrespective of a vehicle speed V at which the vehicle is being towed. Thus, when the vehicle is being towed, it is possible to ensure durability of the first and second pinion gears P1 and P2. On the other hand, in the forward-reverse switching device 90 according to the second embodiment, when the vehicle is normally driven so that the sun gear S is driven for rotation by torque from the engine 12 and any one of the forward clutch C1 and the reverse brake B1 is engaged, the one-way clutch F1 idles, and the one-way clutch F1 does not influence the function of the forward-reverse switching device 90. Thus, the function of the forward-reverse switching device 90 appropriately works.

Figure 9:
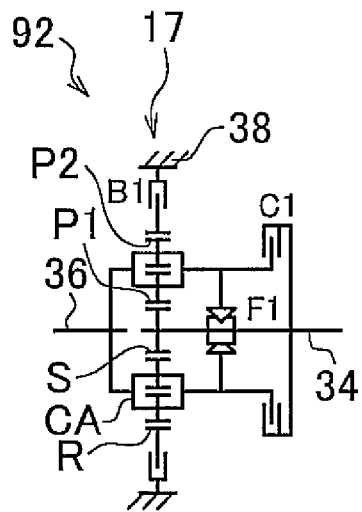
FIG. 9 is a skeleton view that shows a forward-reverse switching device for a vehicle, equipped for the vehicle drive train of FIG. 1, according to a third embodiment.

In the above described first embodiment, the one-way clutch F1 is coupled to the planetary gear set 17 between the second rotating element (ring gear R) and the third rotating element (carrier CA). Instead, in the third embodiment, as shown by a forward-reverse switching device 92 in FIG. 9, the one-way clutch F1 is coupled to the planetary gear set 17 between the first rotating element (sun gear S) and the third rotating element (carrier CA). Then, the one-way clutch F1 is engaged when the rotational speed of the carrier CA exceeds the rotational speed of the sun gear S; whereas the one-way clutch F1 idles when the rotational speed of the carrier CA does not exceed the rotational speed of the sun gear S. That is, the one-way clutch F1 transmits torque from the carrier CA to the sun gear S when the rotational speed of the carrier CA is higher than the rotational speed of the sun gear S; whereas the one-way clutch F1 idles when the rotational speed of the carrier CA is lower than the rotational speed of the sun gear S.

In the thus configured forward-reverse switching device 92, when the vehicle is being towed in the forward direction in a state where rotation of the engine 12 is stopped, the rotational speed of the carrier CA, which is driven for rotation, tends to exceed the rotational speed of the sun gear S of which rotation is stopped; however, the one-way clutch F1 is engaged, so the planetary gear set 17 is integrally rotated. Then, as in the case of the above described first and second embodiments, the first and second pinion gears P1 and P2 revolve but do not rotate on their axes. This prevents the first and second pinion gears P1 and P2 from rotating at a high speed. On the other hand, when any one of the forward clutch C1 and the reverse brake B1 is engaged while the sun gear S is driven for rotation by torque from the engine 12, the rotational speed of the carrier CA does not exceed the rotational speed of the sun gear S. Thus, the one-way clutch F1 idles when the vehicle is normally driven.

With the third embodiment, similar advantageous effects to those of the above described first or second embodiment may be obtained. In addition, the one-way clutch F1 is coupled to the planetary gear set 17 between the first rotating element (sun gear S) and the third rotating element (carrier CA). The one-way clutch F1 is engaged when the rotational speed of the carrier CA exceeds the rotational speed of the sun gear S; whereas the one-way clutch F1 idles when the rotational speed of the carrier CA does not exceed the rotational speed of the sun gear S. Thus, as in the case of the above described first or second embodiment, when the vehicle is being towed in a state where rotation of the engine 12 is stopped, the one-way clutch F1 is engaged to place the planetary gear set 17 in an integrally rotatable state. This prevents an increase in rotational speed at which each of the first and second pinion gears P1 and P2 rotates on its axis irrespective of a vehicle speed V at which the vehicle is being towed. Thus, when the vehicle is being towed, it is possible to ensure durability of the first and second pinion gears P1 and P2. On the other hand, in the forward-reverse switching device 92 according to the third embodiment, when the vehicle is normally driven so that the sun gear S is driven for rotation by torque from the engine 12 and any one of the forward clutch C1 and the reverse brake B1 is engaged, the one-way clutch F1 idles, and the one-way clutch F1 does not influence the function of the forward-reverse switching device 92. Thus, the function of the forward-reverse switching device 92 appropriately works.

Figure 10:
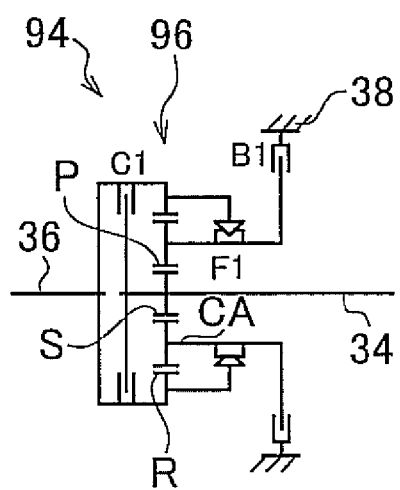
FIG. 10 is a skeleton view that shows a forward-reverse switching device equipped with a single pinion type planetary gear set according to a fourth embodiment.

In the above described first to third embodiments, the forward-reverse switching devices 16, 90 and 92 each include the double pinion type planetary gear set 17. Instead, a forward-reverse switching device 94 according to the fourth embodiment includes a single pinion type planetary gear set 96. FIG. 10 is a skeleton view that shows an example of the forward-reverse switching device 94 that includes the single pinion type planetary gear set 96. In addition, FIG. 11 is a nomograph in the forward-reverse switching device 94.

The forward-reverse switching device 94 is formed of the forward clutch C1, the reverse brake B1 and the planetary gear set 96 as major components. The planetary gear set 96 has a predetermined gear ratio ρ. The planetary gear set 96 includes a sun gear S, pinion gears P, a carrier CA and a ring gear R as rotating elements (elements). The carrier CA rotatably and revolvably supports the pinion gears P. The ring gear R is in mesh with the sun gear S via the pinion gears P. In the forward-reverse switching device 94, the sun gear S is integrally coupled to the turbine shaft 34 of the torque converter 14. That is, the sun gear S is coupled to the engine 12 so that power is transmittable. The ring gear R is integrally coupled to the input shaft 36 of the continuously variable transmission 18. That is, the ring gear R is coupled to the drive wheels 24 so that power is transmittable. In addition, the ring gear R and the sun gear S are selectively coupled to each other via the forward clutch C1, and the carrier CA is selectively fixed to the housing 38 via the reverse brake B1. The housing 38 serves as a non-rotating member.

In the thus configured forward-reverse switching device 94, as the forward clutch C1 is engaged and the reverse brake B1 is released, the forward-reverse switching device 94 is placed in an integrally rotatable state to directly couple the turbine shaft 34 to the input shaft 36. Thus, a forward power transmission path is formed (attained), and power in the forward direction is transmitted to the continuously variable transmission 18. In addition, as the reverse brake B1 is engaged and the forward clutch C1 is released, the forward-reverse switching device 94 forms (attains) a reverse power transmission path, so the input shaft 36 is rotated in the direction reverse to the turbine shaft 34, and power in the reverse direction is transmitted to the continuously variable transmission 18. In addition, as both the forward clutch C1 and the reverse brake B1 are released, the forward-reverse switching device 94 is placed in a neutral state in which power transmission is cut off (power transmission cut-off state).

Figure 11:
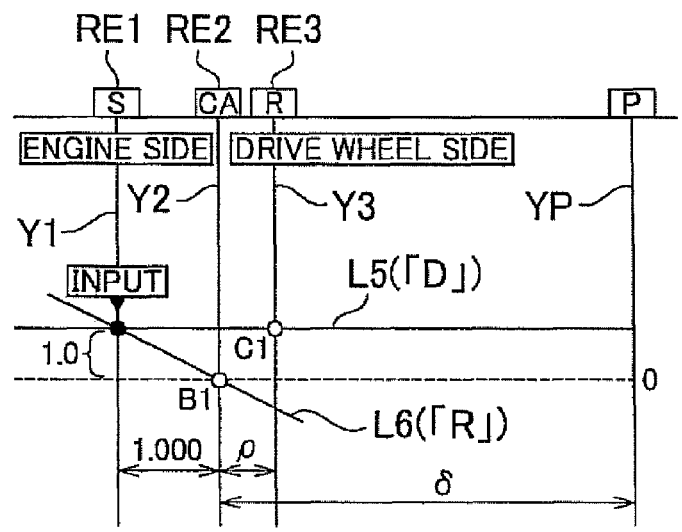
FIG. 11 is a nomograph for the forward-reverse switching device shown in FIG. 10.
Figure 12:
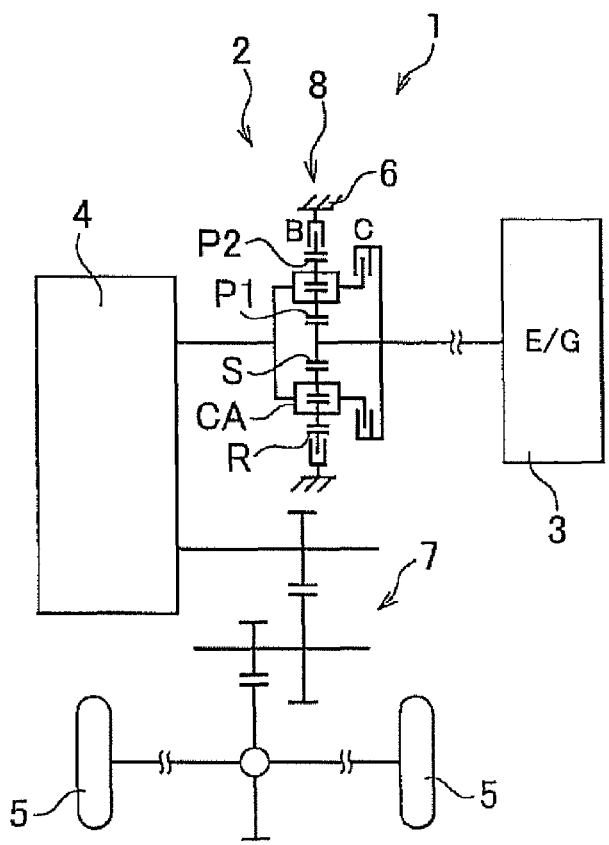
FIG. 12 is a view that shows a drive train equipped with a forward-reverse switching device that is formed of a double pinion type planetary gear set as a major component.
Figure 13A:
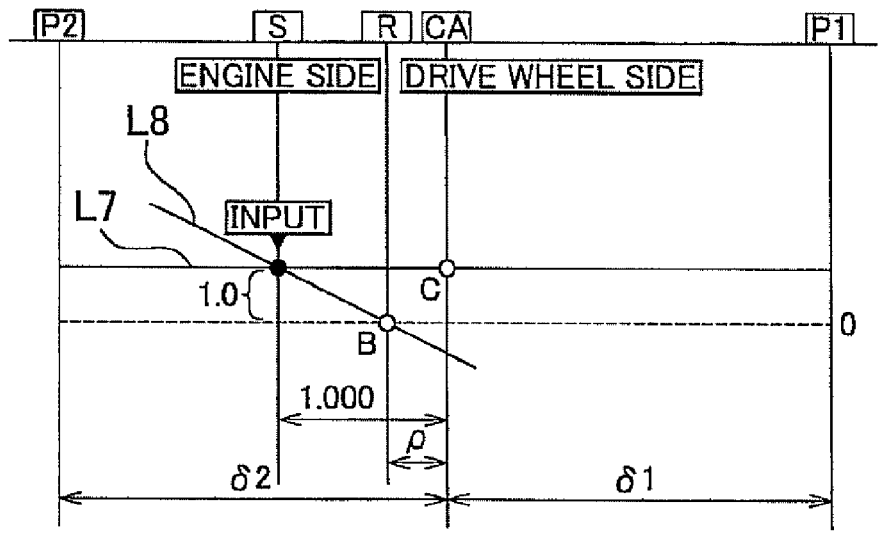
FIG. 13A is a nomograph that can represent the relative relationship among the rotational speeds of rotating elements in the planetary gear set shown in FIG. 12 using straight lines.
Figure 13B:
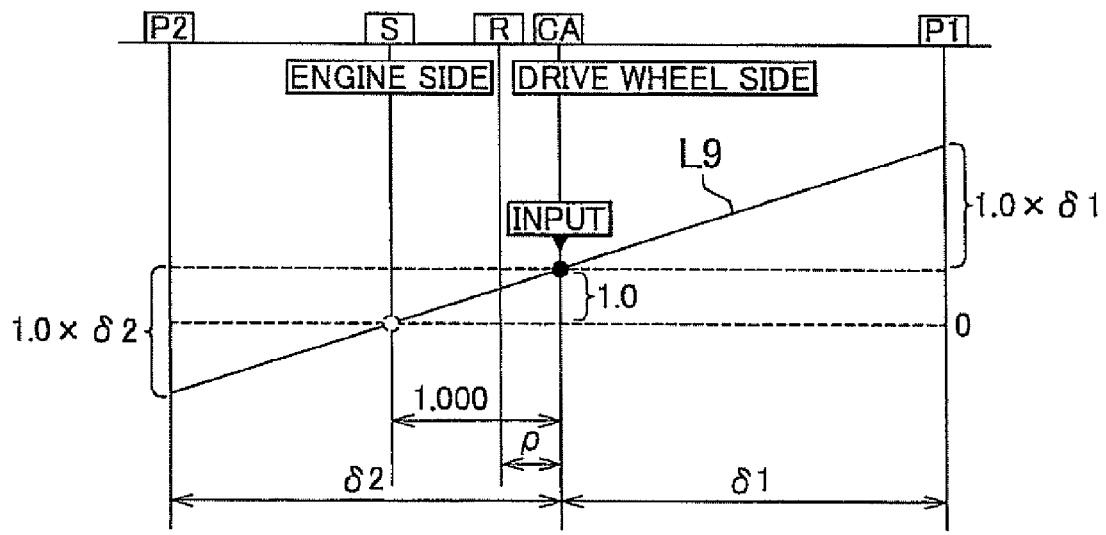
FIG. 13B is a nomograph that can represent the relative relationship among the rotational speeds of the rotating elements in the planetary gear set shown in FIG. 12 using straight lines.

In FIG. 11, three vertical lines Y1, Y2 and Y3 corresponding to the three rotating elements of the planetary gear set 96 indicate the relative rotational speed of the sun gear S corresponding to the first rotating element (first element) RE1, the relative rotational speed of the carrier CA corresponding to the second rotating element (second element) RE2 and the relative rotational speed of the ring gear R corresponding to the third rotating element (third element) RE3 in order from the left. In addition, the vertical line YP corresponding to the other rotating element of the planetary gear set 96 indicates the relative rotational speed of each pinion gear P. When the nomograph shown in FIG. 11 is used, in the forward-reverse switching device 94 according to the fourth embodiment, the first rotating element RE1 (sun gear S) is coupled to the engine 12 via the torque converter 14 so that power is transmittable, and the third rotating element RE3 (ring gear R) is coupled to the drive wheels 24 via the continuously variable transmission 18 so that power is transmittable. In addition, the second rotating element RE2 (carrier CA) is selectively coupled to the housing 38 via the reverse brake B1, and the first rotating element RE1 and the third rotating element RE3 are selectively coupled to each other via the forward clutch C1. Then, as indicated by the straight line L6, when the reverse brake B1 is engaged and the forward clutch C1 is released, rotation of the second rotating element RE2 is prohibited, and the third rotating element RE3 is rotated in the direction opposite to the rotational direction of the first rotating element RE1. By so doing, the forward-reverse switching device 94 forms a reverse power transmission path "R" through which power is transmitted to the drive wheels 24 in the rotational direction opposite to the rotational direction of the engine 12. On the other hand, as indicated by the straight line L5, when the forward clutch C1 is engaged and the reverse brake B1 is released, the first, second and third rotating elements RE1, RE2 and RE3 are integrally rotated, that is, the planetary gear set 96 is placed in an integrally rotatable state, and the third rotating element RE3 is rotated in the same rotational direction at the same rotational speed as the first rotating element RE1. By so doing, the forward-reverse switching device 94 forms a forward power transmission path "D" through which power is transmitted to the drive wheels 24 in the same rotational direction as the engine 12. In this way, the forward-reverse switching device 94 has the function of transmitting the rotation at the side of the engine 12 to the continuously variable transmission 18 (drive wheels 24) in the same rotational direction or in the opposite rotational direction.

Furthermore, the forward-reverse switching device 94 includes the one-way clutch F1. The one-way clutch F1 is coupled to the planetary gear set 96 between the second rotating element (carrier CA) and the third rotating element (ring gear R). The one-way clutch F1 is engaged when the rotational speed of the ring gear R exceeds the rotational speed of the carrier CA; whereas the one-way clutch F1 idles when the rotational speed of the ring gear R does not exceed the rotational speed of the carrier CA. That is, the one-way clutch F1 transmits torque from the ring gear R to the carrier CA when the rotational speed of the ring gear R is higher than the rotational speed of the carrier CA; whereas the one-way clutch F1 idles when the rotational speed of the ring gear R is lower than the rotational speed of the carrier CA.

In the thus configured forward-reverse switching device 94, when the vehicle is being towed in the forward direction in a state where rotation of the engine 12 is stopped, the rotational speed of the ring gear R, which is driven for rotation in a state where rotation of the sun gear S is stopped, tends to exceed the rotational speed of the carrier CA; however, the one-way clutch F1 is engaged, so the planetary gear set 96 is integrally rotated. Thus, irrespective of a vehicle speed V at which the vehicle is being towed, the pinion gears P revolve but do not rotate on their axes. This prevents the pinion gears P from rotating at a high speed. Thus, when the vehicle is being towed, it is possible to ensure durability of the pinion gears P. On the other hand, when any one of the forward clutch C1 and the reverse brake B1 is engaged while the sun gear S is driven for rotation by torque from the engine 12, the rotational speed of the ring gear R does not exceed the rotational speed of the carrier CA. Thus, the one-way clutch F1 idles when the vehicle is normally driven. Thus, when the vehicle is normally driven, the one-way clutch F1 does not influence the function of the forward-reverse switching device 94. Thus, the function of the forward-reverse switching device 94 appropriately works.

With the fourth embodiment, similar advantageous effects to those of the above described first to third embodiments may be obtained. In addition, in the fourth embodiment, the one-way clutch F1 is coupled to the planetary gear set 96 between the second rotating element (carrier CA) and the third rotating element (ring gear R). Instead, as in the case of the above described first to third embodiments, the one-way clutch F1 may be coupled to the planetary gear set 96 between the first rotating element (sun gear S) and the second rotating element (carrier CA) or may be coupled to the planetary gear set 96 between the first rotating element (sun gear S) and the third rotating element (ring gear R). By so doing as well, of course, similar advantageous effects to those of the above described first to third embodiments may be obtained.

The first to fourth embodiments of the invention are described in detail with reference to the accompanying drawings; however, the aspect of the invention may be implemented by a combination of the embodiments or may be implemented by another embodiment.

For example, in the above described first to fourth embodiments, the forward clutch C1 selectively couples the first rotating element RE1 to the third rotating element RE3; however, the aspect of the invention is not limited to this configuration. For example, it is only necessary that at least two rotating elements among the first, second and third rotating elements RE1, RE2 and RE3 are selectively coupled to each other. That is, it is only necessary that the first, second and third rotating elements are integrally rotated, that is, the planetary gear set 17 or 96 is integrally rotated.

In addition, in the above described first to fourth embodiments, the primary pressure Pin applied to the primary hydraulic cylinder 42c is directly controlled. Instead, it is applicable that the primary pressure Pin is controlled so as to be generated as a result of control over the flow rate of working fluid to the primary hydraulic cylinder 42c.

In addition, in the above described first to fourth embodiments, the input shaft rotational speed $N_{IN}$, the associated target input shaft rotational speed $N_{IN}*$, and the like, may be replaced with the engine rotational speed $N_E$, the associated target engine rotational speed $N_E*$, and the like, may be replaced with the turbine rotational speed $N_T$, the associated target turbine rotational speed $N_T*$, and the like, may be replaced with the speed ratio γ (=input shaft rotational speed $N_{IN}$/output shaft rotational speed $N_{OUT}$), the associated target speed ratio γ*, and the like, may be replaced with variables for controlling the speed ratio γ, such as supply/drain flow rate of working fluid to or from the primary hydraulic cylinder 42c or the primary pressure Pin, the associated target value, and the like, or may be replaced with the sheave position, the associated target sheave position, and the like. Thus, a rotational speed sensor, such as an input shaft rotational speed sensor 56, may be provided, where necessary, depending on a rotational speed necessary for control. Note that the sheave position indicates the absolute position of the movable rotary body 42b from a reference position in a direction parallel to the shaft. The reference position is set at a position of the movable rotary body 42b, for example, when the speed ratio γ is 1, that is, the reference position is set so that the sheave position is zero.

In addition, in the above described first to fourth embodiments, the torque converter 14 equipped with the lock-up clutch 26 is employed as the fluid transmission device; however, the lock-up clutch 26 is not necessarily provided. In addition, instead of the torque converter 14, another fluid power transmission device, such as a fluid coupling having no torque amplification function, may be used.

In addition, the above described first to fourth embodiments, a combination of them may be implemented by, for example, assigning priorities to the embodiments.

Note that the above described embodiments are only illustrative; the aspect of the invention may be implemented with various modifications and/or improvements on the basis of the knowledge of the person skilled in the art.

What is claimed is:

1. A forward-reverse switching device for a vehicle, comprising:
   a planetary gear set that has first, second and third rotating elements, the first rotating element corresponding to one of a sun gear, a carrier that rotatably and revolvably supports pinion gears, and a ring gear that is in mesh with the sun gear via the pinion gears, the second rotating element corresponding to one of the remaining of the sun gear, the carrier and the ring gear, and the third rotating element corresponding to the other of the remaining of the sun gear, the carrier and the ring gear; and
   a one-way clutch that is coupled to the planetary gear set and connected between any two rotating elements among the sun gear, the carrier and the ring gear, wherein
   the first rotating element is coupled to a driving force source so that power is transmittable,
   the third rotating element is coupled to a drive wheel so that power is transmittable, the third rotating element is rotated in a direction opposite to a rotational direction of the first rotating element in such a manner that rotation of the second rotating element is prohibited, and the third rotating element is rotated in the same direction as the rotational direction of the first rotating element in such a manner that the first, second and third rotating elements are integrally rotated, and
   the one-way clutch engages to place the planetary gear set in an integrally rotatable state in which torque is transmitted from the third rotating element to the first rotating element when the rotational speed of the third rotating element exceeds the rotational speed of the first rotating element, and idles when the rotational speed of the third rotating element does not exceed the rotational speed of the first rotating element.

2. The forward-reverse switching device according to claim 1, wherein
   the planetary gear set is a double pinion type planetary gear set, the first rotating element is the sun gear, the second rotating element is the ring gear, and the third rotating element is the carrier.

3. The forward-reverse switching device according to claim 1, further comprising:
   a brake that selectively couples the second rotating element to a non-rotating member; and
   a clutch that selectively couples at least two rotating elements among the first, second and third rotating elements.

4. The forward-reverse switching device according to claim 3, wherein
   when the brake is engaged and the clutch is released, rotation of the second rotating element is prohibited to form a reverse power transmission path through which power is transmitted to the drive wheel in a rotational direction opposite to the rotational direction of the driving force source, and
   when the clutch is engaged and the brake is released, the planetary gear set is placed in an integrally rotatable state to form a forward power transmission path through which power is transmitted to the drive wheel in the same rotational direction as the driving force source.

5. The forward-reverse switching device according to claim 1, wherein
   the one-way clutch is coupled to the planetary gear set between the second rotating element and the third rotating element, the one-way clutch is engaged when the rotational speed of the third rotating element exceeds the rotational speed of the second rotating element, and the one-way clutch idles when the rotational speed of the third rotating element does not exceed the rotational speed of the second rotating element.

6. The forward-reverse switching device according to claim 1, wherein
   the forward-reverse switching device is supplied with lubricating oil by an oil pump that is driven for rotation by the driving force source.

7. The forward-reverse switching device according to claim 6, wherein
   the third rotating element is coupled to the drive wheel via an automatic transmission, and
   the oil pump generates working hydraulic pressure that is a source pressure for carrying out shift operation of the automatic transmission.

8. The forward-reverse switching device according to claim 7, wherein the automatic transmission is a belt-type continuously variable transmission that includes a pair of variable pulleys of which effective diameters are variable and a transmission belt that is wound between the pair of variable pulleys, and that steplessly varies a speed ratio in such a manner that the effective diameters of the pair of variable pulleys are varied oppositely.

* * * * *